US00RE49738E

(19) United States
(12) Reissued Patent
Halsey

(10) Patent Number: US RE49,738 E
(45) Date of Reissued Patent: Nov. 28, 2023

(54) PYLON-MOUNTED CAMERA ASSEMBLY WITH MOUNTING STRUCTURE

(71) Applicant: Admiral Video, LLC, Lancaster, NY (US)

(72) Inventor: Paul M. Halsey, Lancaster, NY (US)

(73) Assignee: Admiral Video, LLC., Lancaster, NY (US)

(21) Appl. No.: 16/683,110

(22) Filed: Nov. 13, 2019

Related U.S. Patent Documents

Reissue of:
(64) Patent No.: 9,817,299
Issued: Nov. 14, 2017
Appl. No.: 15/216,989
Filed: Jul. 22, 2016

U.S. Applications:
(60) Provisional application No. 62/306,358, filed on Mar. 10, 2016, provisional application No. 62/195,894, filed on Jul. 23, 2015.

(51) Int. Cl.
*H04N 5/225* (2006.01)
*G03B 17/02* (2021.01)
(Continued)

(52) U.S. Cl.
CPC ..... *G03B 17/561* (2013.01); *A63B 71/023* (2013.01); *G02B 6/4246* (2013.01);
(Continued)

(58) Field of Classification Search
CPC .. A63B 71/023; G02B 6/4246; G02B 6/4284; G03B 17/02; G03B 17/55; G03B 17/561;
(Continued)

(56) References Cited

U.S. PATENT DOCUMENTS 5,190,256 A 3/1993 Macchiarella
5,493,331 A 2/1996 Takahashi et al.
(Continued)

FOREIGN PATENT DOCUMENTS

EP 1911499 4/2008
EP 1911499 A2 4/2008
(Continued)

*Primary Examiner* — Yuzhen Ge
(74) *Attorney, Agent, or Firm* — Simpson & Simpson, PLLC

(57) ABSTRACT

Wired portable or permanent pylon-mounted, single or multiple camera assemblies providing high-definition images, remote video parameter adjustment, real time imaging, lower camera mounting, microphone use, no overheating problems, longer run times, and installation and removal without disturbing field surface. Pylon is molded from high-density, impact resistant foam, integrated with a breakaway connect providing for non-destructively breaking and remaking electrical connections. Increased content of high impact, resistant material provides player and pylon protection. Camera wiring extends internally to integral connecting base fitted with magnets for quick and accurate mating with stationary turf base. Wires in turf carry signals from camera to a fiber optic transmitter that powers the pylon cameras, converts the electrical signals to optical signals, and receives control signals converting them to electrical signals. Thousands of meters range optical signals converted back to electrical high-definition video signals by fiber optic receiver and recorded by replay devices for instant viewing.

32 Claims, 32 Drawing Sheets

(51) Int. Cl.

| | |
|---|---|
| ***G03B 17/56*** | (2021.01) |
| ***H04N 23/51*** | (2023.01) |
| ***H04N 23/54*** | (2023.01) |
| ***H04N 23/50*** | (2023.01) |
| ***A63B 71/02*** | (2006.01) |
| ***G02B 6/42*** | (2006.01) |
| ***G03B 17/55*** | (2021.01) |
| *G02B 6/293* | (2006.01) |

(52) U.S. Cl.
CPC ..... *G02B 6/4284* (2013.01); *G03B 17/02* (2013.01); *G03B 17/55* (2013.01); *H04N 23/50* (2023.01); *H04N 23/51* (2023.01); *H04N 23/54* (2023.01); *A63B 2243/007* (2013.01); *G02B 6/293* (2013.01); *G03B 2217/002* (2013.01)

(58) Field of Classification Search
CPC ... H04N 5/2251; H04N 5/2252; H04N 5/2253
See application file for complete search history.

(56) References Cited

U.S. PATENT DOCUMENTS

| | | | | |
|---|---|---|---|---|
| 6,015,123 | A | 1/2000 | Perez | |
| D586,837 | S | 2/2009 | McCoin | |
| D680,143 | S | 4/2013 | Henssler et al. | |
| D689,112 | S | 9/2013 | Henssler et al. | |
| 8,543,525 | B2 | 9/2013 | Distante et al. | |
| D727,388 | S | 4/2015 | Huang et al. | |
| 9,071,740 | B1 * | 6/2015 | Duffy | H04N 5/2251 |
| D746,350 | S | 12/2015 | Li | |
| 9,442,464 | B2 | 9/2016 | Singleton | |
| D776,740 | S | 1/2017 | Okawa | |
| D781,361 | S | 3/2017 | Dimitriadis et al. | |
| 9,678,411 | B1 * | 6/2017 | Harden | G03B 17/561 |
| 9,817,299 | B2 | 11/2017 | Halsey | |
| 9,823,551 | B2 | 11/2017 | Adervall | |
| 10,139,709 | B2 | 11/2018 | Halsey et al. | |
| 10,394,108 | B2 | 8/2019 | Halsey et al. | |
| 2003/0024171 | A1 | 2/2003 | Kao | |
| 2004/0239759 | A1 | 12/2004 | Wickramaratna | H04N 7/181 348/61 |
| 2005/0162545 | A1 | 7/2005 | Jeon | |
| 2006/0273522 | A1 | 12/2006 | Marshall | A63B 71/0605 273/407 |
| 2008/0204556 | A1 | 8/2008 | de Miranda | |
| 2008/0232061 | A1 | 9/2008 | Wang et al. | |
| 2011/0249100 | A1 * | 10/2011 | Jayaram | H04N 5/23238 348/48 |
| 2012/0242837 | A1 * | 9/2012 | Sasagawa | H04N 5/2254 348/E7.085 |
| 2013/0160464 | A1 * | 6/2013 | Maszczk | F02C 7/20 60/796 |
| 2014/0063260 | A1 | 3/2014 | Bender et al. | H04N 7/183 348/157 |
| 2014/0063335 | A1 * | 3/2014 | Hirai | G03B 17/02 348/374 |
| 2014/0160274 | A1 * | 6/2014 | Ishida | G03B 37/04 348/113 |
| 2014/0212126 | A1 | 7/2014 | Inagaki | |
| 2014/0247324 | A1 | 9/2014 | Cury et al. | |
| 2014/0285669 | A1 | 9/2014 | Lindner et al. | |
| 2015/0195435 | A1 | 7/2015 | Oshida | |
| 2015/0202517 | A1 | 7/2015 | Jacobson et al. | |
| 2015/0271375 | A1 * | 9/2015 | Chien | H04N 7/183 348/159 |
| 2016/0279498 | A1 | 9/2016 | Gordon et al. | |
| 2016/0330362 | A1 | 11/2016 | Singleton | A63B 71/0605 |
| 2016/0346690 | A1 | 12/2016 | Ramachandran | |
| 2017/0039671 | A1 | 2/2017 | Seo et al. | |
| 2017/0056721 | A1 | 3/2017 | Stelfox et al. | |
| 2018/0120672 | A1 | 5/2018 | Huang | |

FOREIGN PATENT DOCUMENTS

| | | |
|---|---|---|
| GB | 2539837 | 12/2016 |
| GB | 2539837 A | 12/2016 |
| JP | 2011130824 | 7/2011 |
| JP | 2011130824 A | 7/2011 |

* cited by examiner

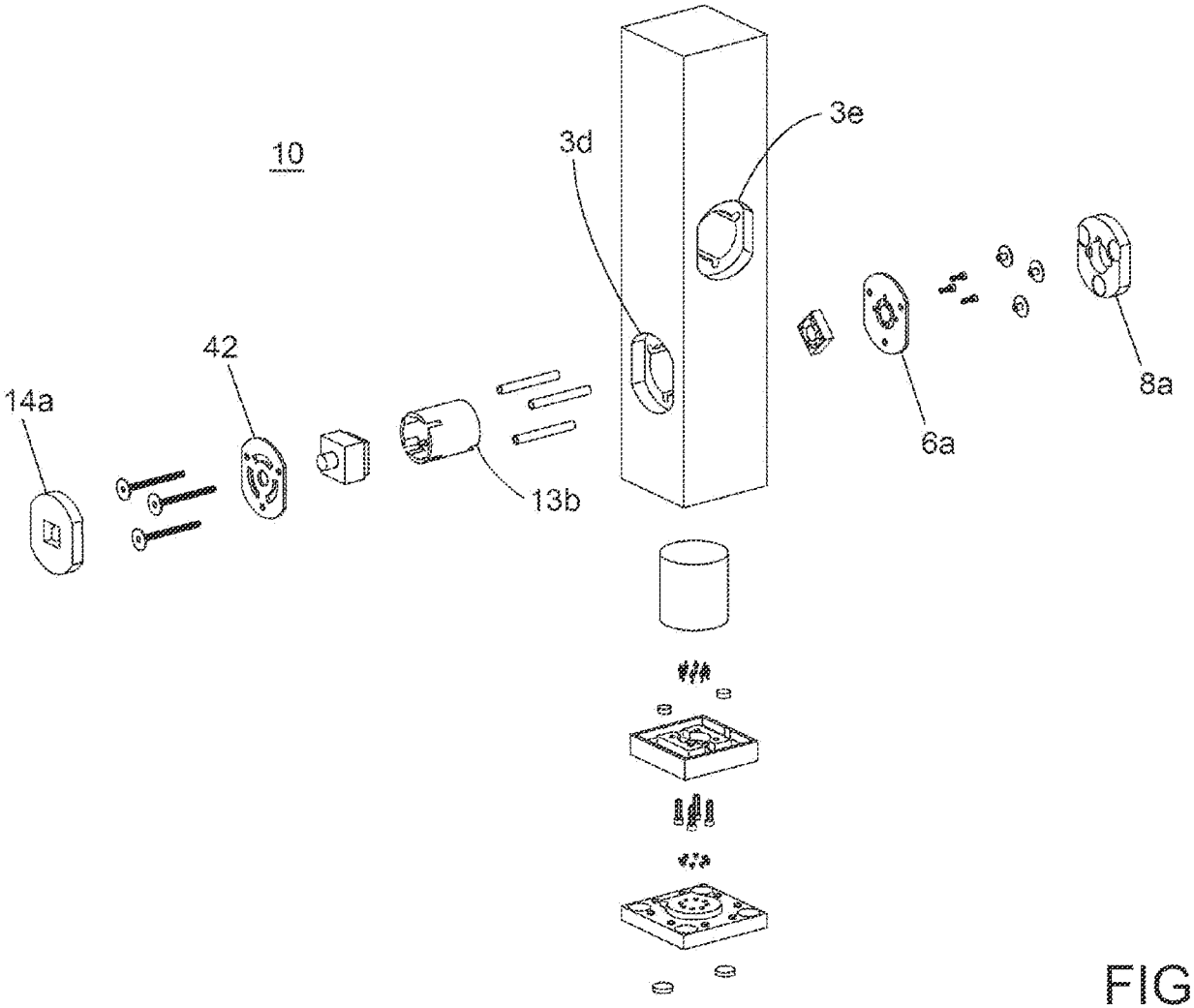
FIG. 2
(AMENDED)

PYLON-MOUNTED CAMERA ASSEMBLY WITH MOUNTING STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This is a Non-Provisional Application of Provisional 62/195,894 filed on Jul. 23, 2015 and Provisional 62/306,358 filed on Mar. 10, 2016.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to a pylon-mounted camera assembly and, more particularly, to a high-definition pylon-mounted camera fitted with a break-away connect base, such that the camera assembly records and transmits high-definition images via electric cables and optical fibers to a receiver. Available are also a base mounting structure, and installation tools.

The background information discussed below is presented to better illustrate the novelty and usefulness of the present invention. This background information is not admitted prior art.

Pylon-mounted cameras have many uses. To describe some details of its use, a pylon camera that records images of a football game will be provided. This description should be understood to be only an example and should not be taken as limiting. A known pylon-mounted camera used to record images in a football end zone consists of a wireless receiver that receives signals from a transmitter to provide video images to a television production crew and to game officials, who may use the video images to determine, for example, whether a touchdown has been scored. In the game of football, a touchdown is scored when a player carries a football across a goal line. More specifically, the touchdown is scored when any part of the football "breaks the plane" of the goal line. The plane of the goal line is the imaginary vertical plane, with reference to a horizontal ground surface, that contains the goal line. In football games, situations often arise where it is not clear whether the football broke the plane of the goal line, such as when a player's forward progress is stopped at or very near the goal line. Similar questions can also arise such as whether a player was down before the football broke the plane, or whether a player had complete possession of the football when the football broke the plane. The images produced by the pylon-mounted camera provide for video-replays which can be reviewed to assist game officials in making the correct call. Football is a very rough sport. Any object on or near the field of play is subject to experiencing very high impact forces. These impact forces can measure hundreds, if not thousands, of pounds, as one or more players can collide or fall to the ground while moving very fast. Thus, pylon-mounted cameras must be rugged and reliable enough to withstand the punishment they will inevitably receive. In a stadium or other facility with an athletic playing surface where use of a pylon-mounted camera assembly is wanted on a continual basis (e.g. a football stadium), it is preferred that such an assembly would be installed once and left in place, rather than requiring that wires be buried and then removed from below the playing surface each time the assembly is used which in many cases could minimally be as frequent as once per week during an athletic season.

SUMMARY

The present Inventor realized that the definition of images produced by known pylon-mounted cameras are, at best, limited to standard resolution. In fact, it is well-known that even though wireless pylon-mounted cameras are a good idea in theory, they are not likely to yield many valuable images in practice. Known wireless pylon cam assemblies must rely on RF (radio frequency) transmitters and receivers to convey their camera images. This, however, reduces image quality due to "compression" associated with RF. Moreover, the known wireless pylon-mounted cameras are not controllable—that is, the video parameters cannot be adjusted while the cameras are in use. In addition, the known wireless pylon-mounted cameras present latency—that is, the video signal is not real time. And, additionally, these assemblies often fail when used in a stadium due to limited RF spectrum. There are also problems with equipment overheating due to the fact that much equipment is in very limited pylon space. The batteries used in the wireless assemblies must be very small in order to fit inside the pylon creating battery problems. One problem posed by small batteries is that they limit operational time and require frequent recharging. The fact that these assemblies require a large amount of equipment to be housed in each pylon, in addition to the batteries, means that there is less room for impact-reducing foam in the pylon, making the pylons more dangerous to players who collide with a pylon.

Accordingly, the present Inventor developed an inventive concept of a pylon-mounted camera that would produce a reliable high-definition video signal. The inventive concept further includes the flexibility of installing the pylon-mounted camera as a permanent feature or as a portable assembly. The concept and the associated inventive principles that provide for the making and use of the high-definition pylon-mounted camera are described herein.

The inventive principles include requiring a pylon-mounted camera to be wired to produce high-definition images. In order to produce the highest-quality high-definition images, the signals must travel through both an electrical cable and a fiber optic cable to the receiver, which is typically located a long distance from the field. To accommodate a wired assembly in an environment as rough and tumble as a football field, another inventive principle introduces the novel use of a molded, high-density, impact resistant foam pylon integrated with a break-away connect that provides a simple and inexpensive technique for non-destructively breaking and remaking electrical connections. All of these benefits provide for a significant reduction of the volume of the pylon needed for housing the camera and related structure. In the present invention, the freed pylon volume provides for an increase in the thickness of the pylon's molded, high-density foam providing for greater impact resistance and safety for players.

High-definition video is video of higher resolution and quality than standard-definition. While there is no standardized meaning for high-definition, generally any video image with considerably more than 480 horizontal lines (North America) or 576 horizontal lines (Europe) is considered high-definition. 480 scan lines is generally the minimum even though the majority of assemblies greatly exceed that. Images of standard resolution captured by a high-speed camera at rates faster than normal (60 frames/second North America, 50 fps Europe) may be considered high-definition in some contexts. Some television series shot on high-definition video are made to look as if they have been shot on film, a technique which is often known as "filmizing".

The wired high-definition pylon-mounted camera assembly, made following the inventive concept and principles, is able to present full high-definition images, in part, because there is no video compression. Sending the video images long distances via a combination of electrical and optical signals also means that when, for example, a football stadium using the wired pylon-mounted cameras is in use, the application of limited RF spectrum is not required resulting in reliable high-definition images. The wired high-definition pylon-mounted camera assembly provides for remote adjustment of video parameters, such as exposure, contrast, color, etc. An important part of the present invention is the use of a magnetic "break-away" connector for safety of the electrical connections when hit. The present invention allows cameras to be used "LIVE" since there is no delay in the video providing for real time use. The increased content of high impact, resistant material in the pylons means that both the structure of the invention is safer and the players that impact upon the pylon are safer. The reduced pylon volume required to be used for housing the camera and its related parts (e.g., no battery and transmitter needed) also provides for lower mounting of the cameras than has been previously possible. The reduction of the amount of equipment inside the pylon also means that there are no more overheating problems. The use of AC power, or a larger battery, in the fiber transmission box means the assembly can run for longer periods of time. If desired, a microphone, such as a Cardioid microphone, for example, is securely positioned on a pylon to ensure that its primary direction of pick-up is oriented to face the viewing areas of one or more of the cameras. The present Inventor realizing that when athletic playing fields are composed of natural grass, the root systems of the grass and the uniformity of the substrate materials can be adversely affected by the frequent earthwork that would be required to continually install and remove an assembly, and that for both natural grass and artificial turf playing fields, the ongoing cost of labor to continually install and remove an assembly over a long term period could make use of the assembly cost-prohibitive, devised an inventive concept, the principles of which are described as follows. In locations where a permanent installation is desired, the assembly derived from the inventive principles provides for permanent installation of a conduit that enables various types of wires and cables to be run to the pylon location without continually doing earthwork to place such wires and cables below the field surface. In addition to minimizing ongoing labor costs, this allows for the installation to be "future-proof," in that as new types of cameras, video signals, or other requirements for the pylons arise, new types of wires or cables to support these functions can be placed in the conduits with minimal effort and without requiring the field playing surface to be disturbed.

The inventive principles provide for easy installation and removal of a connector base, cap, or pass-through cap at the pylon end of the installed conduit, providing for the mounting and removal of each of these parts without disturbing the field's playing surface. Moreover, in the event the installation site is outdoors, the pylon assembly is fabricated is to withstand the elements, and is constructed to withstand the forces that can be caused by player impact and by the impact of machinery used in routine field maintenance. Rigidity of the assembly at the pylon end of the installed conduit is achieved by securing a base mounting flange to the solid base substrate material of a field that may be concrete, compacted crushed stone, or another similar material. Fins on the internally threaded coupler provide resistance to any externally applied radial force once the area around the installed assembly is backfilled with soil.

Player safety is also taken into account by the inventive concept. The assembly allows for a certain amount of impact force absorption, so that if a player were to fall upon the installed connector base, cap, or pass-through cap, they would not be subject to any force substantially greater than if they had fallen upon the playing surface immediately surrounding the installed assembly. This impact force absorption is accomplished by using rubber or foam rubber for certain components of the mounting assembly.

After installation, the assembly is capable of being adjusted vertically to adapt to grade changes that may take place over time due to routine field maintenance practices such as "top dressing" or "de-thatching".

In the example of a football field the location, with respect to the boundaries of the field where the assembly is installed, must be precisely located. This, in turn, can be helpful for the grounds crew who paint the boundaries onto the field as they can use the location of the installed assembly as a reference point applying paint, chalk, or a similar compound to the field to mark the boundaries. Thus, the inventive concept includes providing for a Line Marking Template Tool.

Yet other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which:

FIG. 2 is an exploded view of a high-definition pylon-mounted camera, illustrating a variation in design elements.

A LIST OF THE REFERENCE NUMBERS AND PARTS TO WHICH THEY REFER

Figure 1:
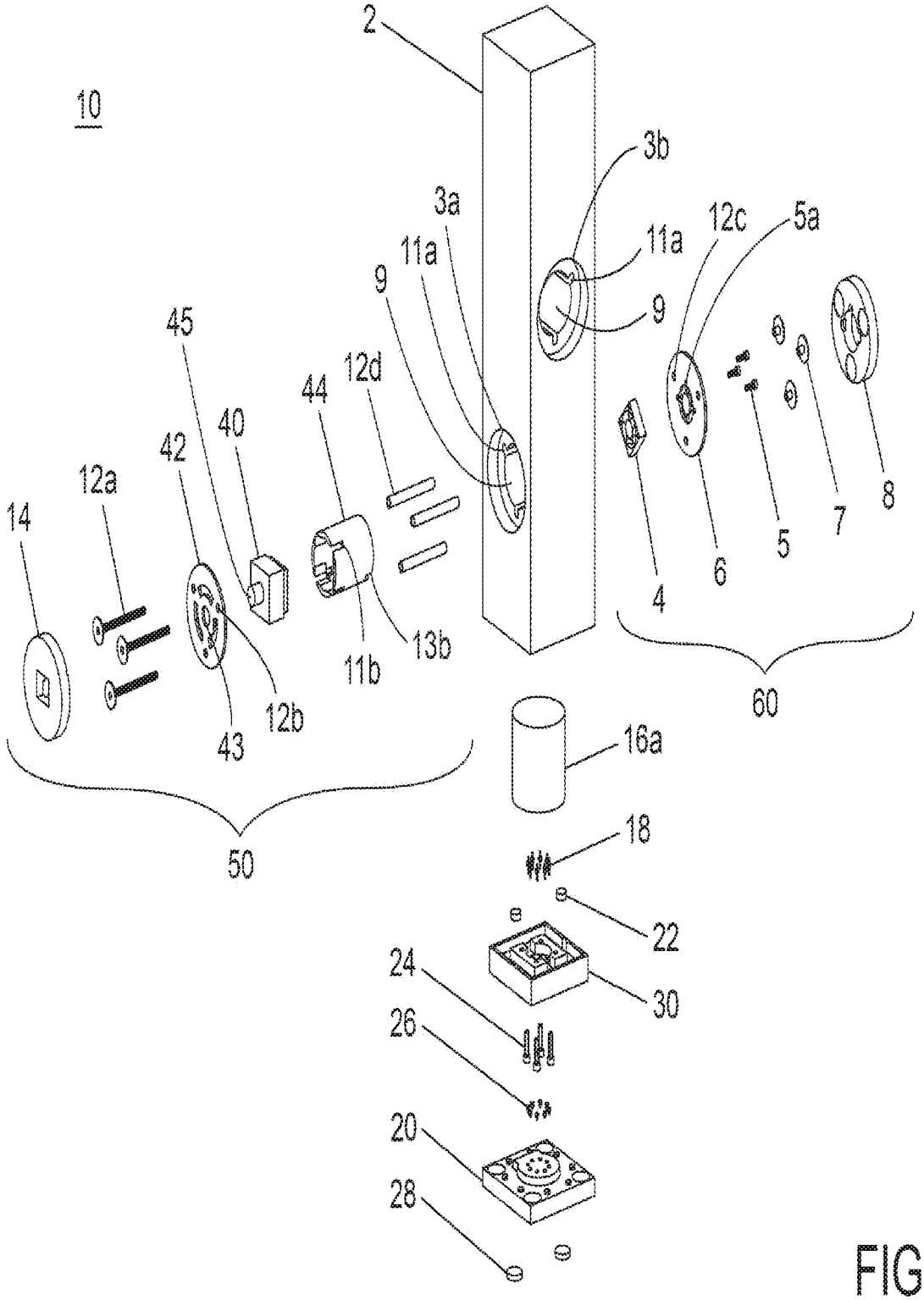
FIG. 1 is an exploded view of a high-definition pylon-mounted camera.

2 Pylon.
2a Pylon configured with USB3 connectors.
3a Camera housing cavity.
3b Camera housing cavity.
3d Camera housing cavity.
3e Camera housing cavity.
3f Camera housing cavity.
4 Fan.
5 Socket head cap screw.
5a Socket head cap screw apertures.
6 Fan flange.
6a Fan flange.
7 T-nut.
8 Fan flange cover.
8a Fan flange cover.
9 Circular flange seat.
10 A pylon-mounted camera assembly according to the principles of the present invention.
11a Notches in circular flange seat 9.
11b Notches in first end of camera housing 44.
12a T-bolt.
12b T-bolt apertures in camera-flange 42.
12c T-bolt apertures in fan flange 6.
12d Sleeves for T-bolts 12a.
13b Notches in second end of camera housing 44 to accept wiring.
14 Camera-flange cover.
14a Camera-flange cover.
15 Camera mounting sled.
16a Stabilizing weight.
16 Recess for stabilizing weight.
17a Wire conduit.
17b Wire conduit.
18 Pogo pin.
20 Connector base.
21n North pole magnet.
21s South pole magnet.
22n North pole magnet.
22s South pole magnet.
23n Accepting space for north pole magnet 22n.
23s Accepting space for south pole magnet 22s.
25n Accepting space for north pole magnet 21n.
25s Accepting space for south pole magnet 21s.
24 Socket head cap screw.
26 Pad.
28 Magnet.
30 Pylon connector.
40 Camera.
42 Camera-flange.
[42a Camera-flange.]
43 Hole for lens in camera flange 42.
44 Housing for camera 40.
45 Camera lens.
50 Camera sub-assembly.
60 Fan sub-assembly.
61 Foam cover for chip holding space 66.
65 Chip holding space integrated into camera housing cavity.
66 Chip holding space.
70 Diagrammatic circuit.
72 Power supply or battery.

74 Power cable.
76 Transmitter.
78 Fiber-optic cable.
80 Cable for video, data, and power.
82 Receiver.
84 Power supply or battery.
86 Power cable.
88 Data cable.
90 Video cable.
92 Controller.
94 Video Recorder.
95 Data cables inside transmitter.
97 Optical-to-electrical converter.
98 Re-clocking distribution amplifier.
99 Electrical-to-optical converter.
101a Pod.
101b Pod.
102a Duplex nail aperture.
102b Duplex nail aperture.
103a Duplex nail aperture.
103b Duplex nail aperture.
104a Duplex nail aperture.
104b Duplex nail aperture.
105a Duplex nail aperture.
105b Duplex nail aperture.
106a Positioning Lines.
106b Positioning lines.
107 Center section.
108 Flange.
109a Arm.
109b Arm.
110 Duplex nail.
111 Duplex nail top section.
113a 4"×8" Tool.
113b 4"×8" Tool.
115 String.
116 String.
117 Label.
118 Tool.
119 Hexagonal accepting space.
120a Pin.
120b Pin aperture.
121 Cap.
122a Flathead screw aperture in cap 121.
122b Screw aperture in locking nut 134.
122c Socket head cap screw aperture in connector base 123.
122d Flathead screw aperture in pass-through cap 124.
123 Connector base.
124 Pass-through cap.
125 Foam rubber washer.
126 Rubber plug.
127 Wedging plug.
128a Accepting space for anti-rotation pin 128b.
128b Anti-rotation pin.
129a Externally threaded upper conduit section.
129b Internally threaded coupler.
129c Externally threaded lower conduit section.
130a Cable pass-through aperture in wedging plug 127.
130b Cable pass-through aperture in rubber plug 126.
130c Cable pass-through aperture in foam rubber washer 125.
130d Cable pass-through aperture in locking nut 134.
131a Fin.
132 Base mounting flange.
133 90 Degree Sweep Conduit.
134 Locking Nut.
135 Pylon-mounted camera system
136a Tapered section of wedging plug 127.
136b Tapered accepting space in rubber plug 126.
137a Top flange of rubber plug 126.
137b Top surface of externally threaded top conduit section 129a.
138a Threaded surface of cable pass-through aperture 130d.
138b Threaded section of wedging plug 127.
140 Ground Surface Finished Grade (Abstraction).
150 Base Mounting System.
151 Plug sub-assembly.
201 USB3 plug.
202 Flexible video, data, and power cable electrically connected to USB3 plug 201.
203 USB3 receptacle.
204 Flexible video, data, and power cable electrically connected to USB3 receptacle 203.
205 Foam insert.
206a Cable pass-through aperture in pylon 2a.
206b End of flexible cable 202.
207a Notch in pylon 2a.
207b Notch in foam insert 205.
210 Self-sealing cap.
211 Cap.
212 Notch in cap 211.
213 Rubber gasket.
222e Flathead screw aperture in cap 211.
235 Pylon-mounted camera system configured with USB3 connector.

It should be understood that the drawings are not necessarily to scale. In certain instances, details which are not necessary for an understanding of the present invention or which render other details difficult to perceive may have been omitted.

DEFINITIONS

Pogo pin, as used herein, is a device used in electronics to establish a (usually temporary) connection between two printed circuit boards or other electronic connectors. The pogo pin usually takes the form of a slender cylinder containing two sharp, spring-loaded pins. Pressed between two electronic circuits, the sharp points at each end of the pogo pin make secure contacts with the two circuits and thereby connect them together. Pogo pins are usually arranged in a dense array, connecting together many individual nodes of the two circuit boards. They are very commonly used to facilitate rapid, reliable connection of devices. The particular pogo pins used in the example as illustrated are only single-ended and not sharp, i.e., one end has the spring-loaded plunger with a rounded end and the other end is just a rounded cylinder to which wires are soldered or otherwise connected.

Pylon, as used herein, refers to an orange marker placed at each of the corners of the end-zone of a football field that are usually made of a padded material. They are used as a visual aid to mark the inside corners of the end-zone. The pylons are not permanent and they move easily when hit. This is for safety reasons, as a permanent structure would hurt players moving near the corner of the end-zone. The pylon is considered part of the field; it cannot interfere with a play. The pylons were introduced because game officials needed an easy way to see the edges of the end-zone from a distance.

Wavelength-division multiplexing (WDM) in fiber-optic communications is a technology which multiplexes a number of optical carrier signals onto a single optical fiber by using different wavelengths (i.e., colors) of laser light. This technique enables bidirectional communications over one strand of fiber, as well as multiplication of capacity.

DETAILED DESCRIPTION

Referring now, with more particularity, to the drawings, it should be noted that the disclosed invention is disposed to various sizes, shapes, and forms and to various embodiments in various sizes, shapes, and forms. Therefore, the embodiments described herein are provided with the understanding that the present disclosure is intended as illustrative and is not intended to limit the invention in any way.

How to make and how to use the present invention is explained using an example of a high-definition, wired, video replay, pylon-mounted camera assembly installed in an end zone of a football field to, among other things, provide high definition images of crucial moments of play. It is to be understood that the same benefits are also available in many other activities, such as games of tennis, basketball, etc., racing of any kind, and any other activity where high-definition fixed images of the activity would be appreciated. The pylon-mounted camera assembly is straightforward, safe and reliable. It does not include parts that require excessive space inside the pylon and that produce poor quality images, such as RF transmitters, batteries and hard inner sleeves inside the pylon. The pylon camera, made according to the present invention, includes a flexible hi-impact-resistant pylon with a foam body having machined openings that accept a plurality of camera mounting sleds. The working parts on each sled require much less of the pylon's inner-volume than the wireless RF known assemblies, resulting in a greater volume of foam body filling the pylon's inner-volume. This provides the pylon assembly with greater impact resistance which, in turn, provides greater safety for the players. Moreover, the compact design of the sleds allows the pylon foam to bend and flex when hit. Mounted inside each protective sled is a controllable high-definition camera with interchangeable lens and a cooling fan. Internal wiring from each camera flows down to the integral pylon connector that forms the connecting base of each pylon. Inside the connector is a plurality of spring loaded "pogo pins". The connector is designed to mate with its mating counterpart connector in only one way. Additionally, the body of each connector is shaped to provide keyed fit of the two connectors to each other. Furthermore, each connector is fitted with magnets that assist in the orientation of the connector for quick and accurate mating. The mating counterpart that mates with the pylon connector is the "pylon base" that is easily and quickly inserted into the turf where it remains stationary in the ground during game play (when, of course, the assembly is being used in a football game). The pylon base is provided with a number of mating contact pads equal to the number of pogo pins in the pylon connector. Wires inserted within the turf carry the electrical signals that travel from the camera through the pylon connector to the base connector to a fiber optic transmitter that powers the pylon cameras and converts the electrical signals to optical signals. In the example case of the football field, the transmitter is located on the sidelines away from the field of play. The transmitter also receives the control signals for the cameras and converts them to electrical signals. The optical signals have a range of many thousands of meters and when received by the fiber optic receiver are converted back to electrical high-definition video signals where they can be recorded by replay devices and viewed by game officials and/or television broadcasters.

Figure 1A:
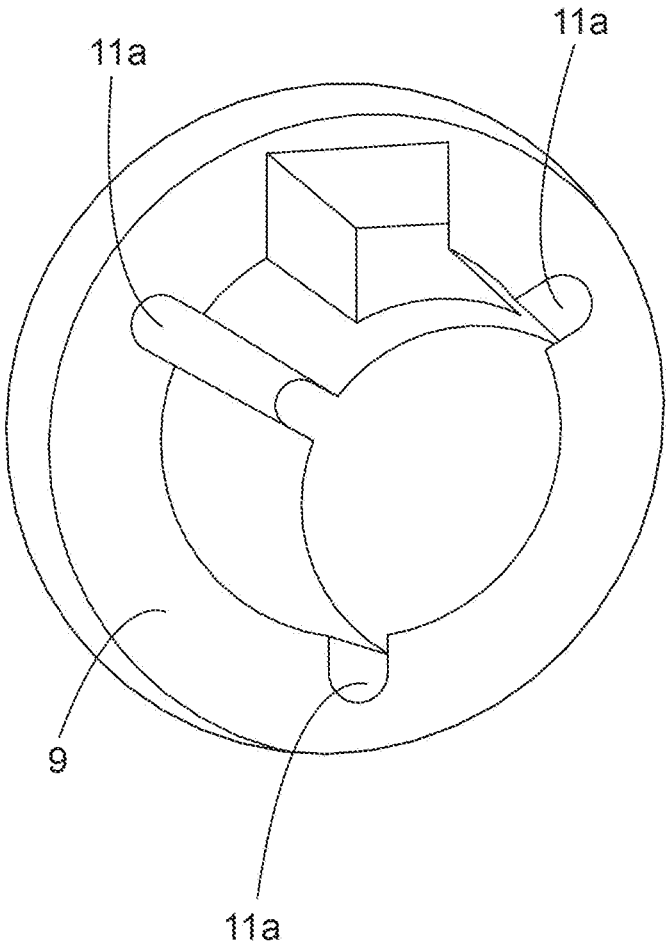
FIG. 1a is a detailed view illustrating notches in camera housing cavity.
Figure 1B:
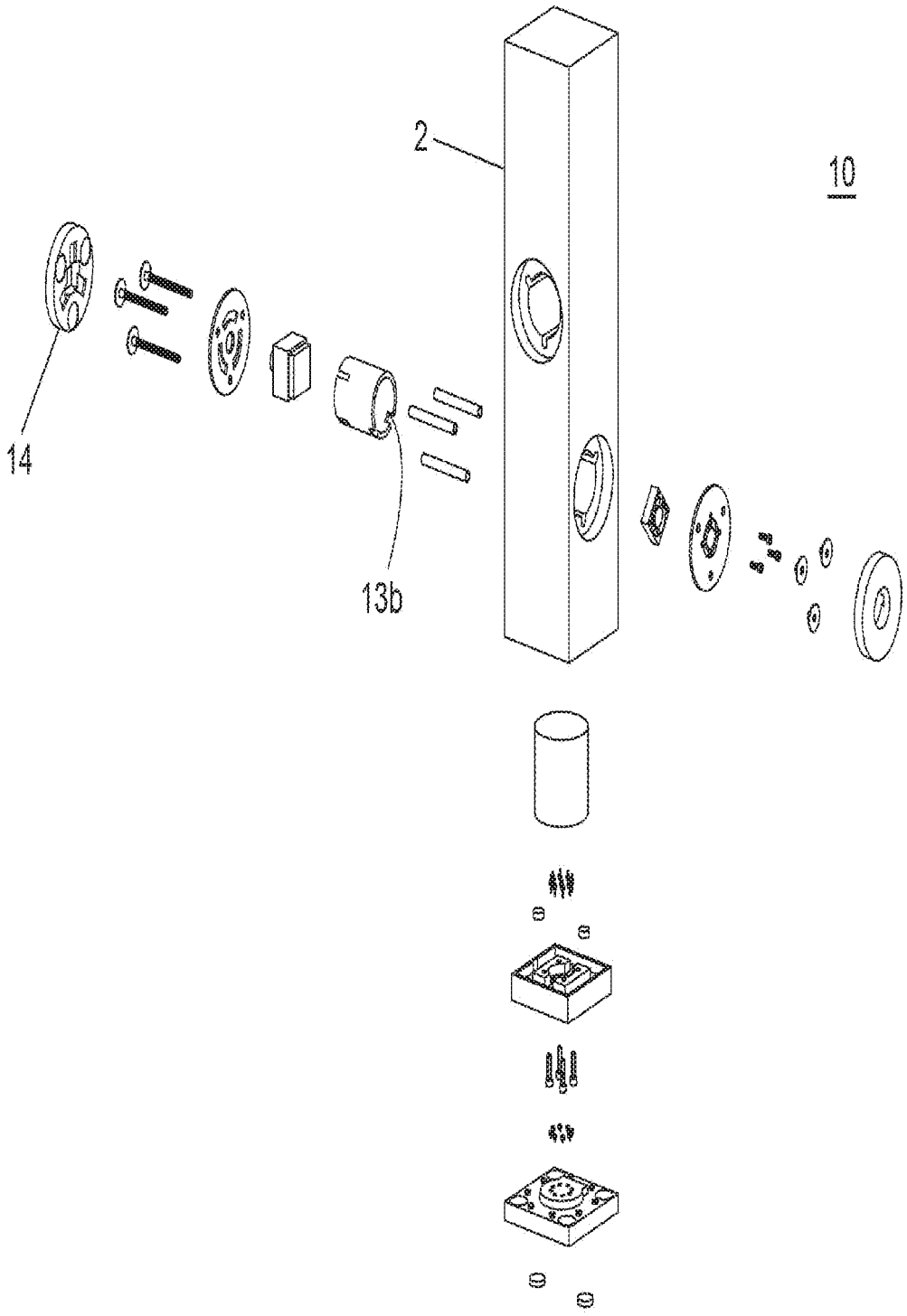
FIG. 1b is a reverse exploded view of a high-definition pylon-mounted camera.
Figure 14:
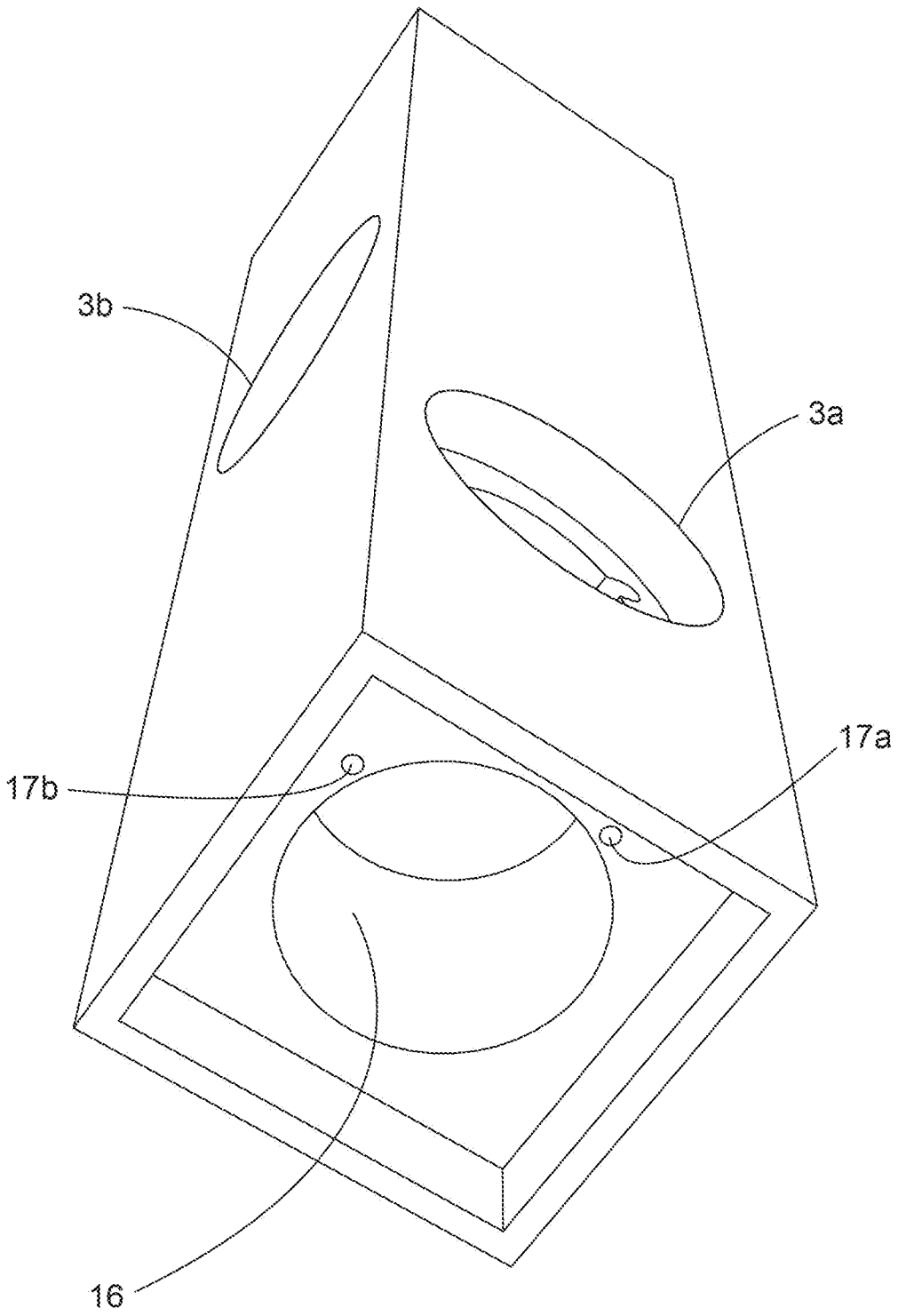
FIG. 14 is a perspective bottom-up view of a two-camera pylon illustrating a cavity for positioning of a stabilizing weight and conduits for electrical wire.
Figure 15:
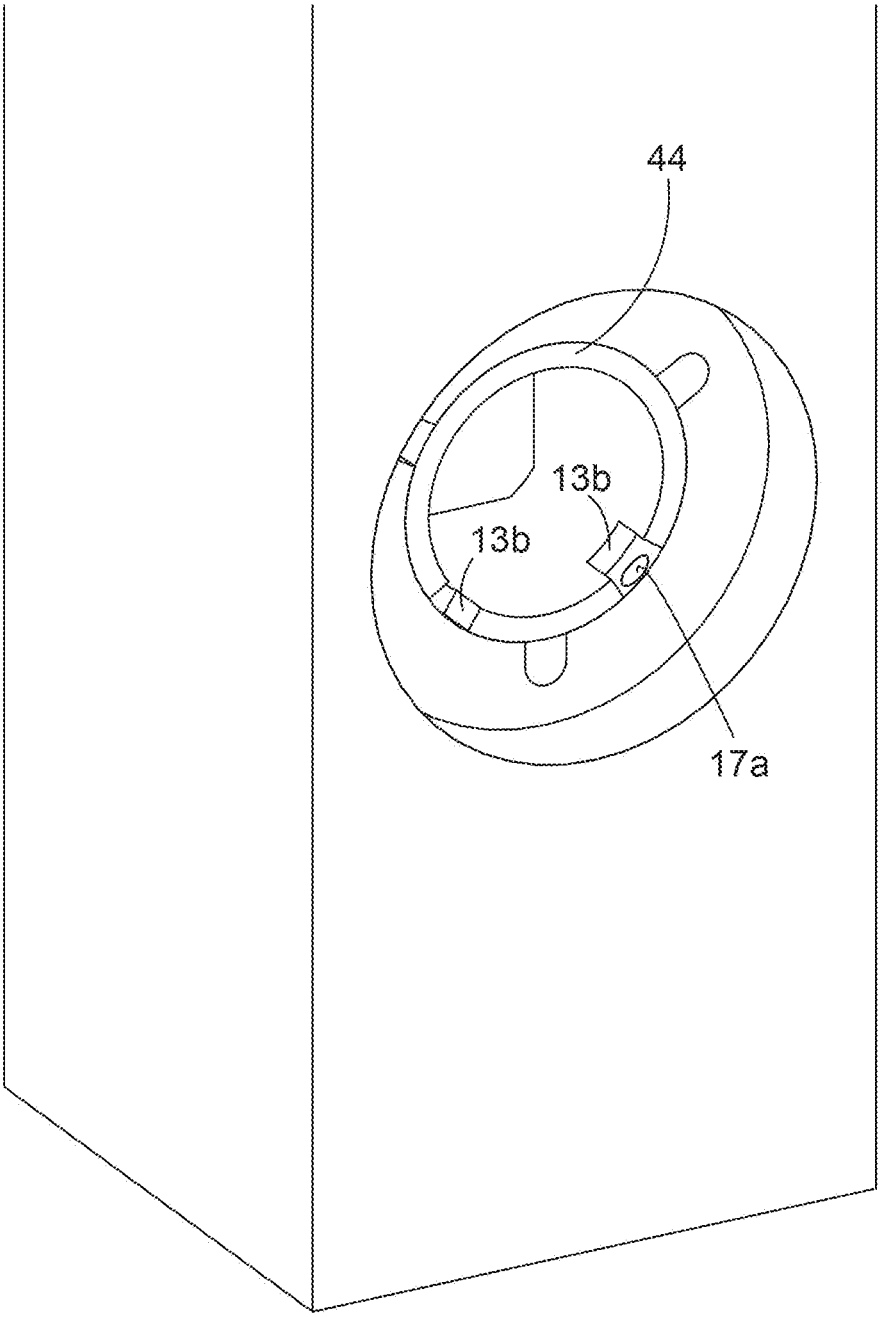
FIG. 15 is a perspective side view of a two-camera pylon illustrating an electrical wire conduit drilled so as to line-up with notch in camera housing.

Turning now to the drawings that provide an illustrative example of a high-definition pylon-mounted camera, FIG. 1 illustrates an exploded view of a high-definition pylon-mounted camera assembly 10. FIG. 1b illustrates a reverse exploded view of the high-definition pylon-mounted camera, as illustrated in FIG. 1. Pylon 2, in this example, is manufactured from molded, high-density, impact resistant foam. Except for connector base 20, the camera, its related structures, and the wiring connecting the camera to connector base 20, are housed within pylon 2. Cavities 3a and 3b are each machined into a face of the pylon to continue entirely through the pylon each creating a cavity that will accept a camera/fan sled. It is to be understood that pylon 2 may contain one or a plurality of cavities there-through, if desired, each that may accept a camera mounting sled 15 (see FIG. 4 and discussion thereof), or other equipment, in addition to internal wiring. The height of each cavity within the pylon is offset vertically from another or other cavities sufficient to ensure that no two cavities intersect, thus providing for a "crush zone" between cavities. Integral to the surrounding foam making up the pylon within each cavity is circular flange seat 9 that is created by the same machining processes that creates the cavities. Flange seat 9 is sized so that the internal diameter of the cavity with the flange seat will accept housing 44 providing for a friction fit. Camera sub-assembly 50, as illustrated, consists of several parts, which once functionally joined into a single section, will be housed within one end of cavity 3a. The several parts of camera sub-assembly 50, included in this embodiment, are: camera 40 having interchangeable lens structure 45; camera housing 44, and camera-flange 42. The end of camera housing 44 that is proximate to camera flange 42 is referred to as the "first end," while the opposing end of camera housing 44 is referred to as the "second end." Camera flange 42 contacts the front of the camera, and the back of the camera contacts the housing 44 by way of seating in the notches 11b in the first end of the housing. Fan sub-assembly 60, also consisting of several parts to be functionally joined into a single section, will be housed within the other end of the cavity 3a. Once both the assembled sub-assembly 50 and the assembled sub-assembly 60 are inserted into opposing ends of cavity 3a they will be attached to each other constituting what is referred to as the "sled." Three notches 11a positioned equidistant from each other around the inner-circumference circular flange seat 9 provide for T-bolts 12a to pass through the pylon to connect with mating T-nuts 7 to relate camera 40 to fan 4, fan flange 6 and fan flange cover 8 (an analogous set of notches are provided in cavity 3b to serve the same function). Each T-bolt 12a, once connected to a T-nut 7, is covered by a sleeve 12d (see FIG. 3, a break-away view of the camera and fan structure parts of the pylon-mounted camera from the camera structure end). Each sleeve 12d is a piece of metal tubing, the inside diameter of which is sized to accept the smooth outside diameter of the threaded section of the T-Nut 7. Once the sled is assembled, the end of each sleeve makes contact with both the inside surfaces of the camera-flange 42 and the fan flange 6 (see FIG. 4, a perspective tilted view of the camera and fan sections, from the camera structure end, which illustrates how these sections are connected when positioned within the pylon). The outside surface of the sleeve engages along the length of notches 11a in the flange seat 9 and, in addition to the friction fit between the foam of the pylon and the parts of the sled, helps act to prevent the sled from rotating within the camera housing cavity 3a. Camera-flange 42 securely affixes camera 40 to housing 44 using t-bolts 12a inserted through bolt apertures 12b. Camera lens opening 43 in camera flange 42 is the aperture through which light travels to camera lens 45. Camera-flange cover 14 provides protection for the camera and its lens. Cooling fan sub-assembly 60 includes fan 4 that is protected by fan flange 6. Fan 4 is secured to fan flange 6 by socket head cap screws 5 through apertures 5a in fan flange 6. T-bolts 12a extend through apertures 12b in camera-flange 42 and through apertures 12c in fan flange 6 to be threaded into T-nuts 7 and torqued until they secure the sled assembly parts together. Fan 4, provides cooling air to flow around the parts of the assembly that constitute sled 15. Camera sub-assembly 50 and cooling fan sub-assembly 60 together constitute what is referred to as the "sled" 15 which is secured within housing cavity 3a by camera-flange cover 14 at one end of cavity 3a and by fan flange cover 8 at the other end of cavity 3a. Recess 16 (see FIG. 14) is machined into the bottom of the pylon into which weight 16a is to be embedded in the pylon to increase pylon stability. Wire conduits are drilled into the pylon to provide one or more routes for electrical wiring to connect one or more cameras with the transmitting part of the assembly. For example conduit 17a provides electrical wire access to cavity 3a and conduit 17b provides electrical wire access to cavity 3b. FIG. 1a illustrates three notches 11a machined into flange seat 9, as discussed above. Two notches 13b machined into the second end of camera housing 44 accommodate borehole conduits electrical transmitting wires (see FIG. 1b which illustrates one of the two notches). It is to be understood that the inventive concept and principles contemplate all methods and means of situating the borehole conduits that achieve the desired result and, also, that the inventive concept and principles contemplate any number of notches and electrical wire conduits that are required for a particular use.

Figure 3:
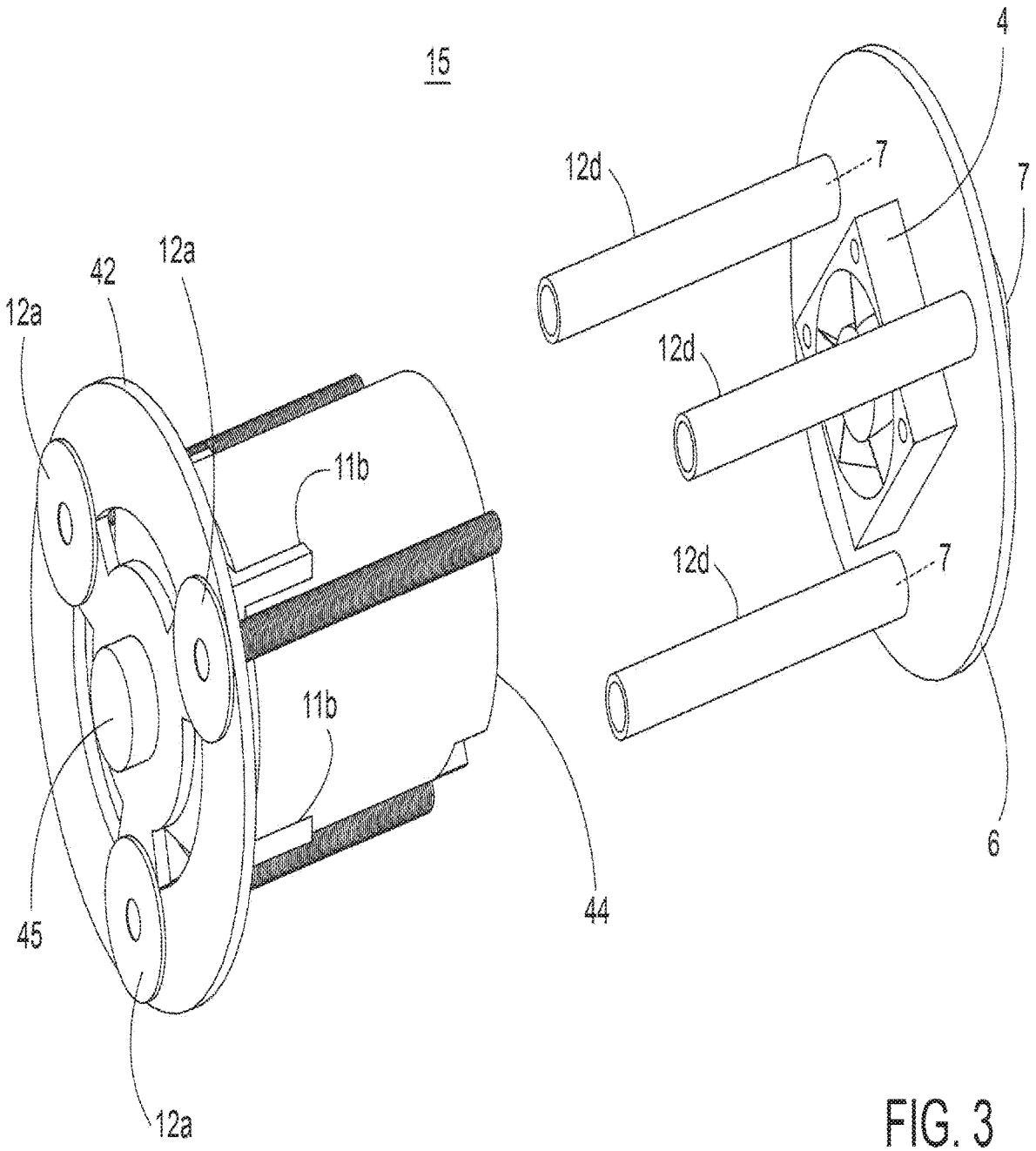
FIG. 3 is a break-away view of the camera and fan structure parts of the pylon-mounted camera from the camera structure end.
Figure 4:
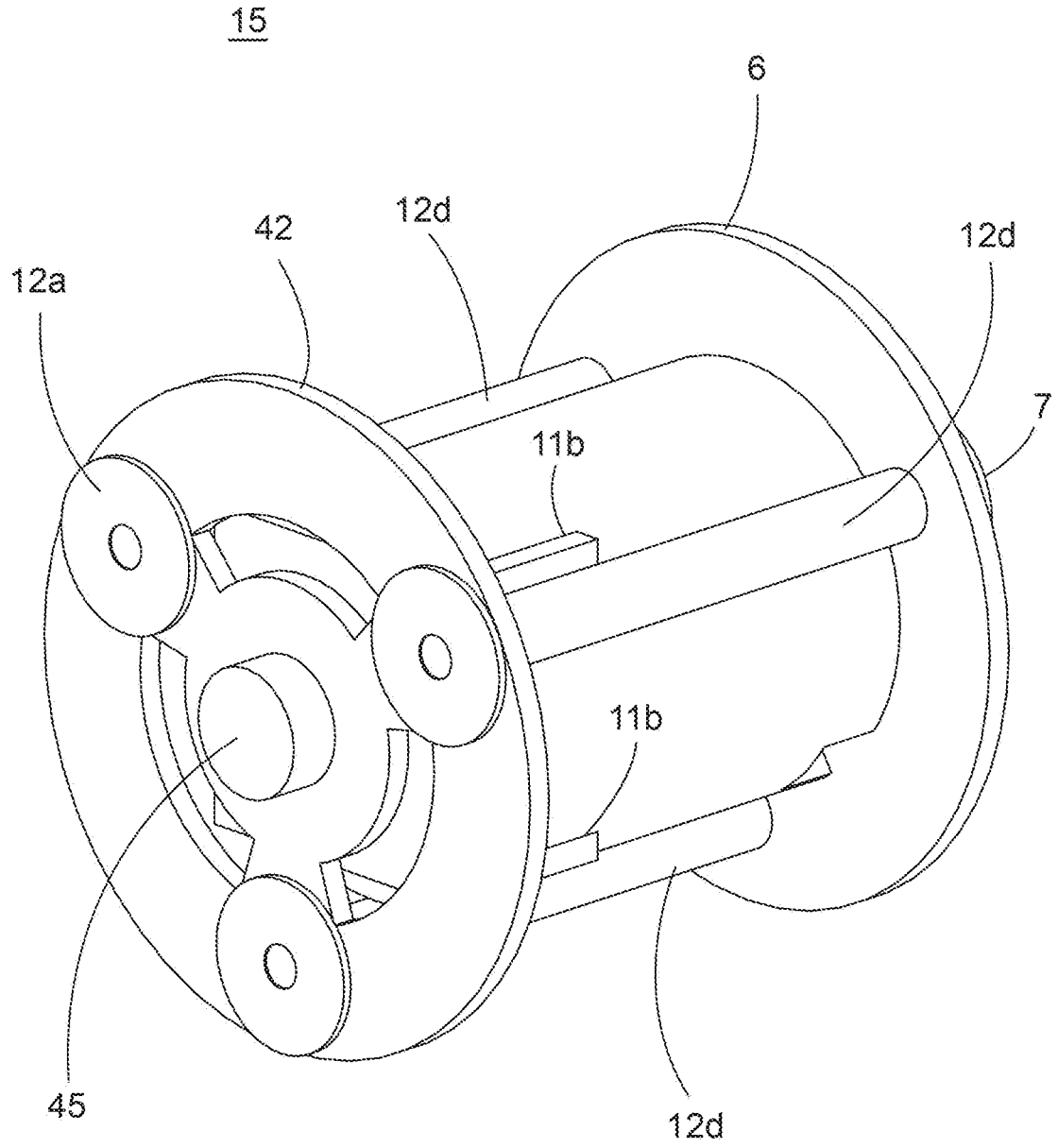
FIG. 4 is a perspective tilted view of the camera and fan sections, from the camera structure end, illustrating how these sections are connected when positioned within the pylon.

*The following description should be taken in view of FIGS. 3 through 4. The camera-fan assembly is configured to be a rigid frame, specifically an open and rigid frame. As described supra, sleeves 12d are preferably metal in construction, thereby providing rigidity between flanges 6 and 42, connected by bolts 12a and T-nuts 7, where bolts 12a are further arranged within their respective sleeves 12d, when assembled (as shown in FIG. 4). Sleeves 12d are arranged circumferentially and proximate to the outer edge of flanges 6 and 42 thereby creating space therebetween—providing an open and rigid construction between flanges 6 and 42 which are secured by bolts 12a (within sleeves 12d) and T-nuts 7, i.e., forming rigid connectors between flanges 6 and 42. The aforementioned rigid connectors are elongated spacers which each have a major axis that is arranged to extend substantially between flanges 6 and 42, such that the spacers maintain a space, or distance, between flanges 6 and 42. In a preferred embodiment, the aforementioned rigid connectors are arranged to surround camera housing 44 and the camera therein. Due to the preferable metal construction of sleeves 12d, and composition of bolts 12a (known in the art to be comprised of a rigid material, such as a metal), when secured to flanges 6 and 42, the respective assembly (i.e., sleeves 12d, bolts 12a, nuts 7, and flanges 6 and 42) is an open and rigid frame. The aforementioned rigid connectors preferably have a substantially cylindrical portion that extends between flanges 6 and 42, are arranged at points approximately equidistant from a central axis of the open and rigid frame, and are arranged in parallel to connect flanges 6 and 42 such that flange 6 and flange 42 are spaced apart in approximately parallel planes.*

Figure 5:
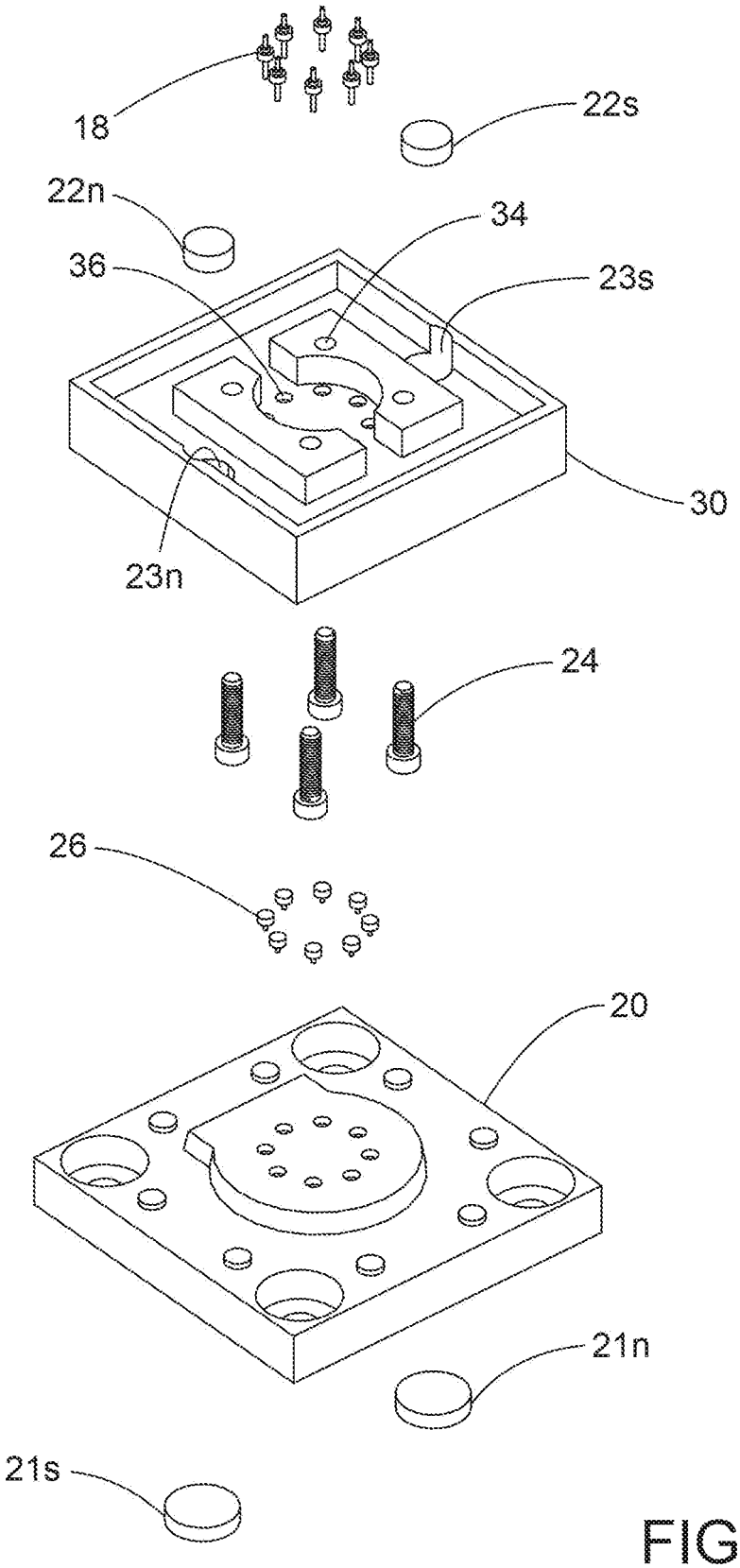
FIG. 5 is an exploded view looking-down on the top surfaces of the base sections of the high-definition pylon-mounted camera.
Figure 6:
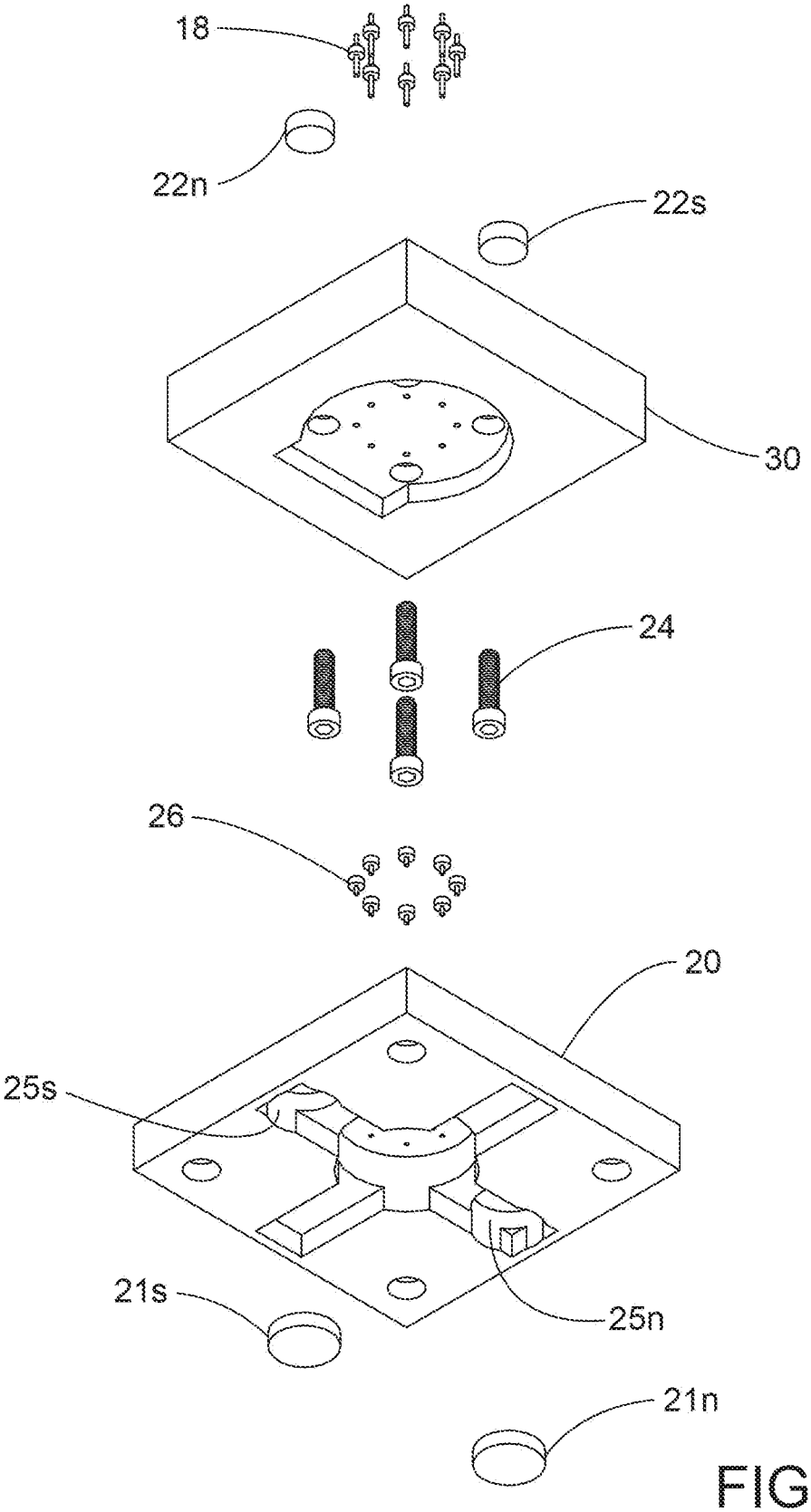
FIG. 6 is an exploded view looking-up to the bottom surfaces of the base sections of the high-definition pylon-mounted camera.

The wiring accommodated within the two notches 13b carry power, data, and video signals between the camera 40 and the pogo pins 18 (see also FIGS. 5, 6, 7 and 8) that are part of the pylon connector 30 that constitutes the base of the pylon. FIG. 5, an exploded view, illustrates the top surfaces of the unassembled base sections 20 and 30 of the high-definition pylon-mounted camera and FIG. 6, an exploded view, illustrates the bottom surfaces of the unassembled base sections 20 and 30 of the high-definition pylon-mounted camera. For the assembly to transmit images from the camera to the truck, the wiring of the pylon must be connected to the transmitting part of the assembly, which means connecting pylon connector 30 to connector base 20. This connection of the wires from the pylon connector 30 to base connector 20 to a transmitter provides for nearly instant connection between the electronics within the pylon and the production truck. When the assembled pylon is placed onto the assembled base 20, the force of magnetic attraction between magnets 23n and 23s in pylon connector 30 and magnets 21n and 21s in base connector 20 (see FIGS. 5, 6 and 7) in combination with the force of gravity bring the pylon connector 30 and connector base 20 together such that pogo pins 18 make contact with the pads 26, completing the electrical circuits necessary to carry power, data, and video signals between the camera and the transmitter. The wires from the pads 26 in the base connector 20 extend underground and then return above ground some distance away, at which point they connect to the transmitter. Pogo pins 18 and pads 26 are made of a conductive material such as copper and may be gold-plated to decrease their electrical resistance. Electrical wires are connected to the pogo pins and pads by means of soldering. Electrical wires extend from the pads 26 to the Transmitter. Pylon connector 30 and connector base 20 are each keyed so that the pylon must be correctly oriented for the pylon connector to fully seat onto the base. Magnets 23s and 23n are installed in the pylon connector 30, and magnets 21n and 21s are installed in the base connector 20 so that when each connector is oriented so that the keys align, magnets of opposite polarity are also aligned. The surface of connector base 20 is relieved to allow a small amount of any foreign materials from the environment in which the base is installed (e.g. grass or other turf material, gravel, dirt, or similar substrate materials) to sit below the level of the pylon base and not interfere with connector mating. A number of smaller contact points remain elevated to support the pylon connector when it is mated. After wires are soldered onto the pads, the hollow recess on the underside of the pylon base is "potted," i.e. filled with non-conductive epoxy or a similar material. This acts as a strain relief for the electrical wires, provides a moisture-resistant barrier to protect the electrical connections, and permanently holds the pads and the magnets in place.

Figure 7:
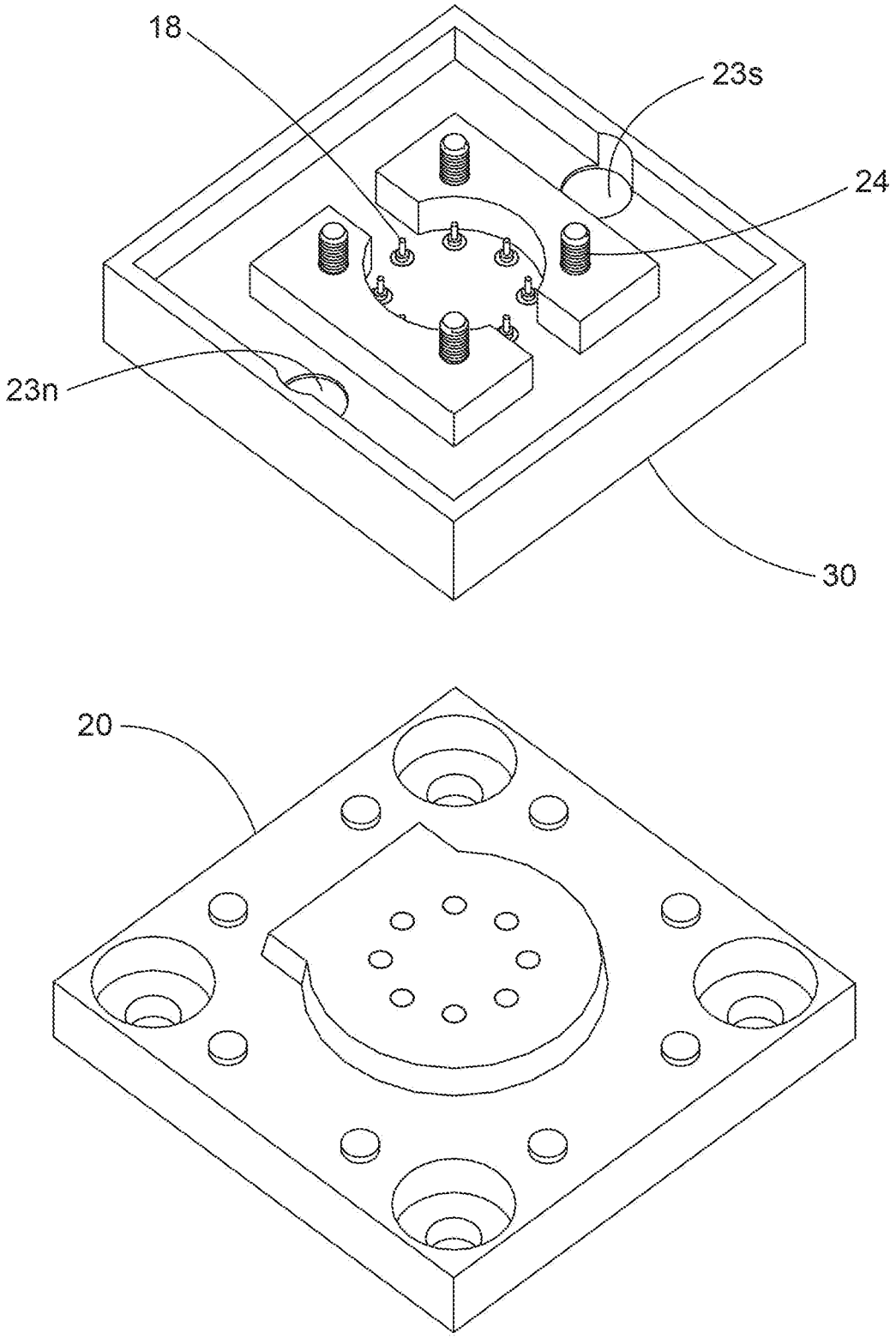
FIG. 7 is a break-away view looking-down on the top surfaces of the base sections of the high-definition pylon-mounted camera with the hardware and magnets in place.
Figure 8:
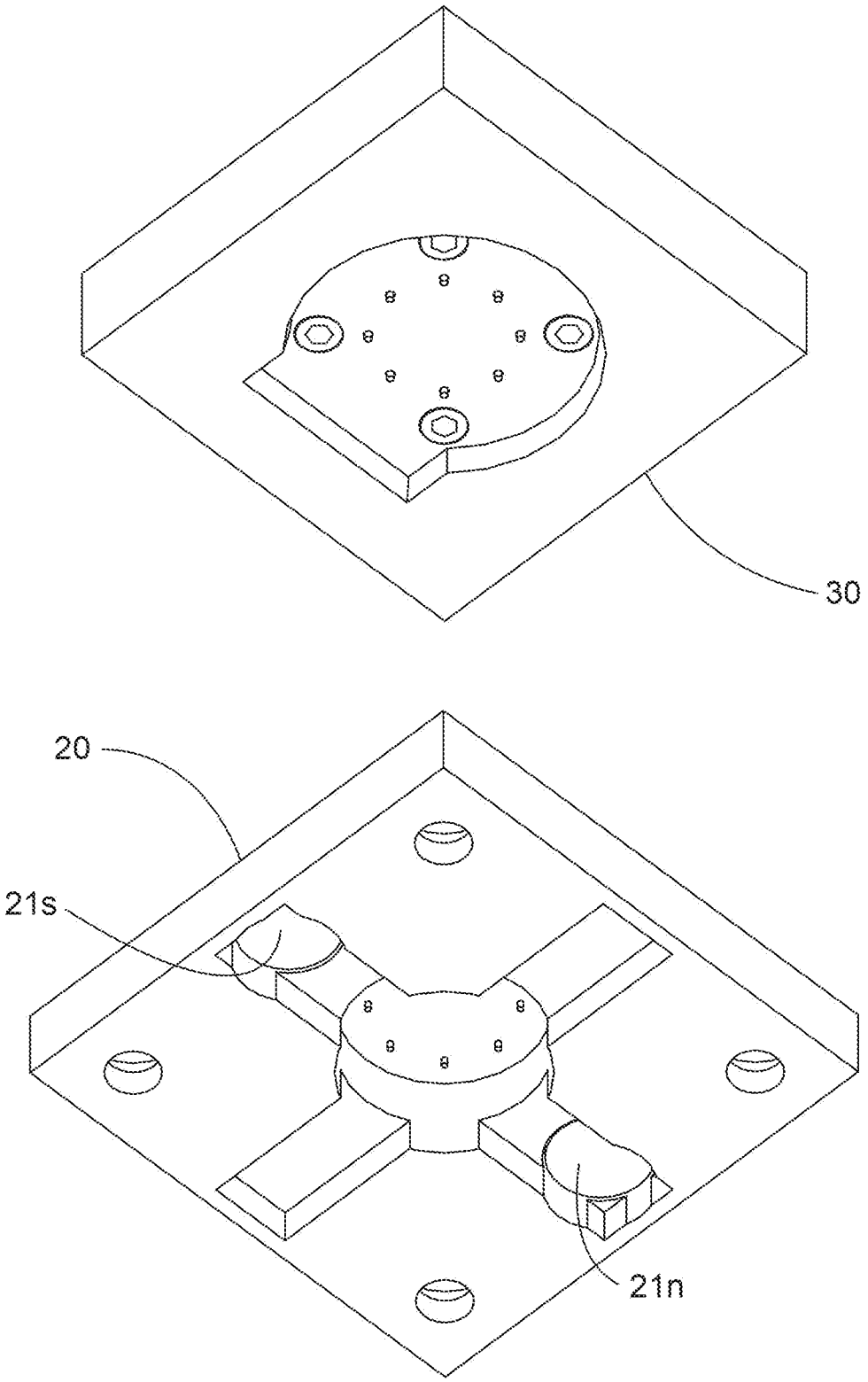
FIG. 8 is a break-away view looking-up to the bottom surfaces of the base sections of the high-definition pylon-mounted camera with the hardware and magnets in place.

If desired, a microphone, such as a Cardioid microphone, for example, is securely positioned on a pylon to ensure that its primary direction of pick-up is oriented to face the viewing areas of one or more of the cameras. In the assembly illustrated, the microphone will be positioned, in this example, on the corner of the pylon between the cameras in cavities 3a and 3b. FIG. 7, a break-away view, illustrates the top surfaces of the base sections 20 and 30 of the high-definition pylon-mounted camera with the hardware and magnets in place and FIG. 8, a break-away view looking-up to the bottom surfaces of the base sections 20 and 30, illustrates these sections with the hardware and magnets in place.

Figure 9:
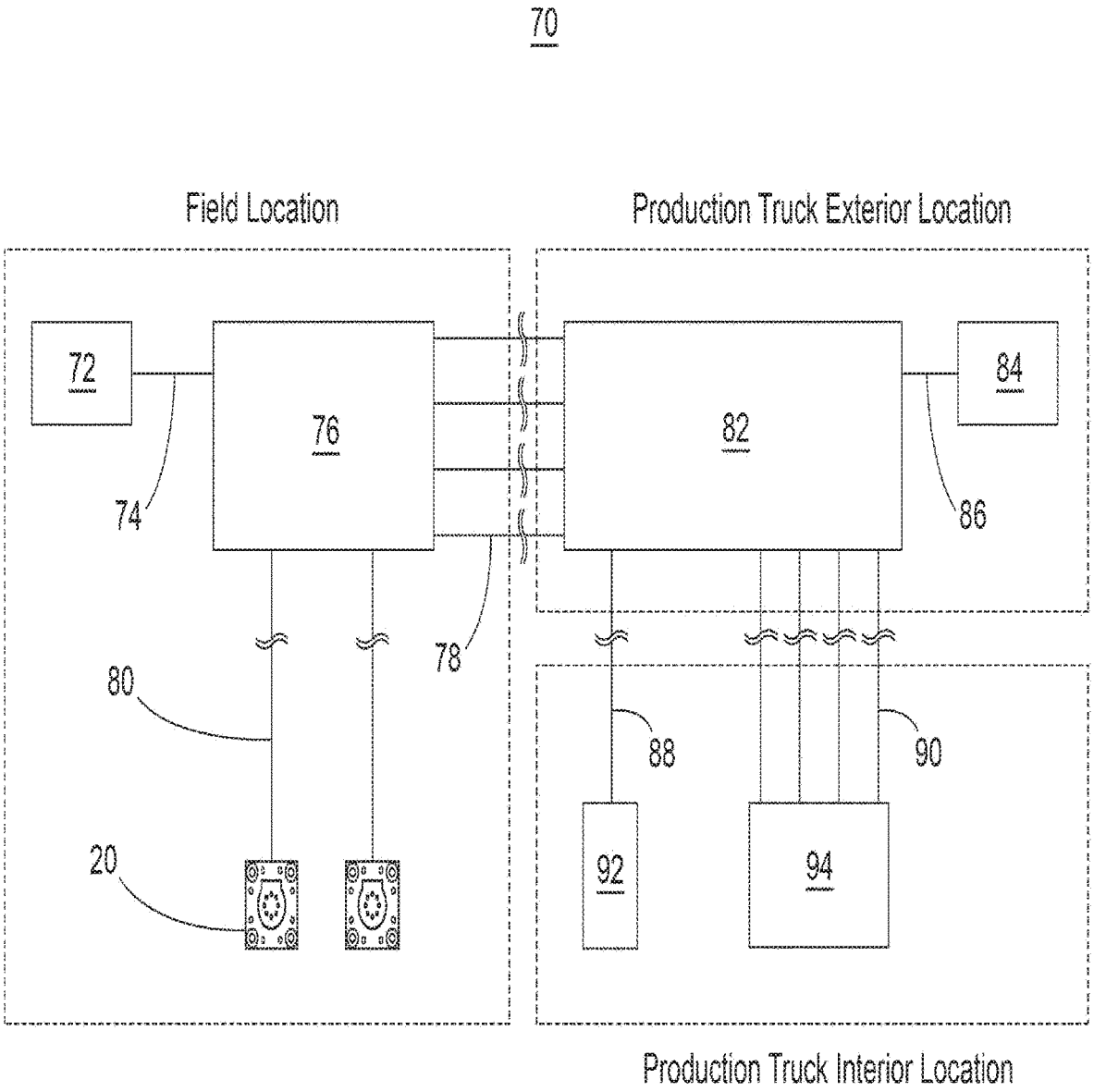
FIG. 9 is a diagrammatic exemplar electric circuit used in the pylon-mounted camera assembly, as shown in FIG. 1.

FIG. 9 an exemplar electric circuit diagram illustrates transmitter 76. Housed inside transmitter 76 are data cables 95 (not shown) connected to an optical-to-electrical converter 97 (not shown). Video cables 80 are connected first to a re-clocking distribution amplifier 98 and then to an electrical-to-optical converter 99 (not shown). Power cables 74 are connected to power source 72 such as a battery or power supply, which also powers the distribution amplifier 98 (not shown) and optical converters 97. A typical transmitter may have more than one signal path to accommodate multiple cameras in a single pylon, as contemplated by the inventive concept, and/or multiple pylons each with multiple cameras. Fiber-optic cable 78 is connected between transmitter 76 and receiver 82. The use of Wavelength-division multiplexing (WDM) technology enables bi-directional signals to share a single, single-mode optical fiber. Additional fiber-optic cables may be used, one for each additional signal path from the Transmitter. Inside receiver 82, an optical-to-electrical converter (not shown), connects to video cables 90 which will be connected to the production truck for additional processing, if desired, and for recording by instant replay devices or for live use in a broadcast. Controller 92 connects to an electrical-to-optical converter (not shown) to allow camera control signals to be sent to the cameras. The optical converters are powered by a power source 84 such as a battery or power supply. Receiver 82 may have more than one signal path, the exact number of which would be determined by the number of camera signal paths 78 being sent from transmitter 76 and matched in quantity.

Figure 10:
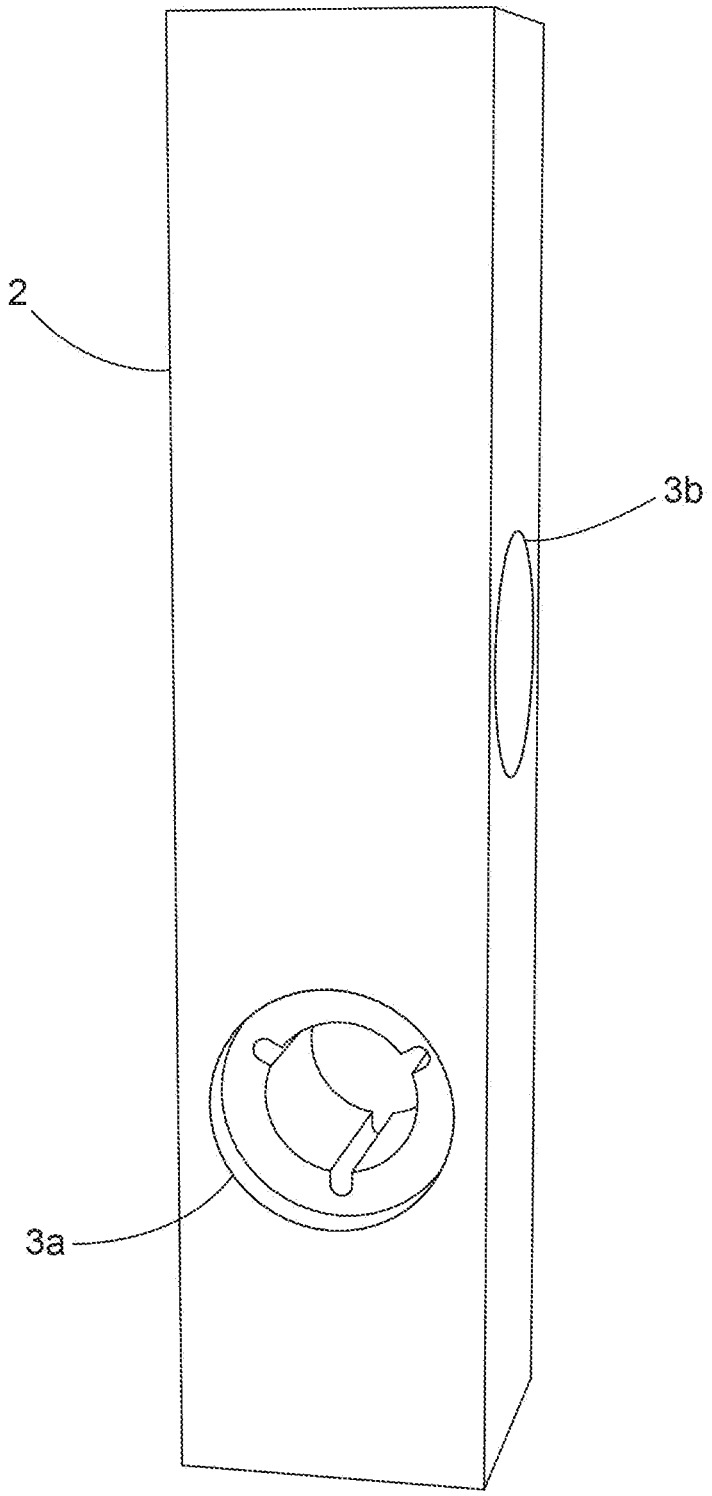
FIG. 10 is a perspective view of a two-camera pylon having circularly-shaped cavity openings.
Figure 11:
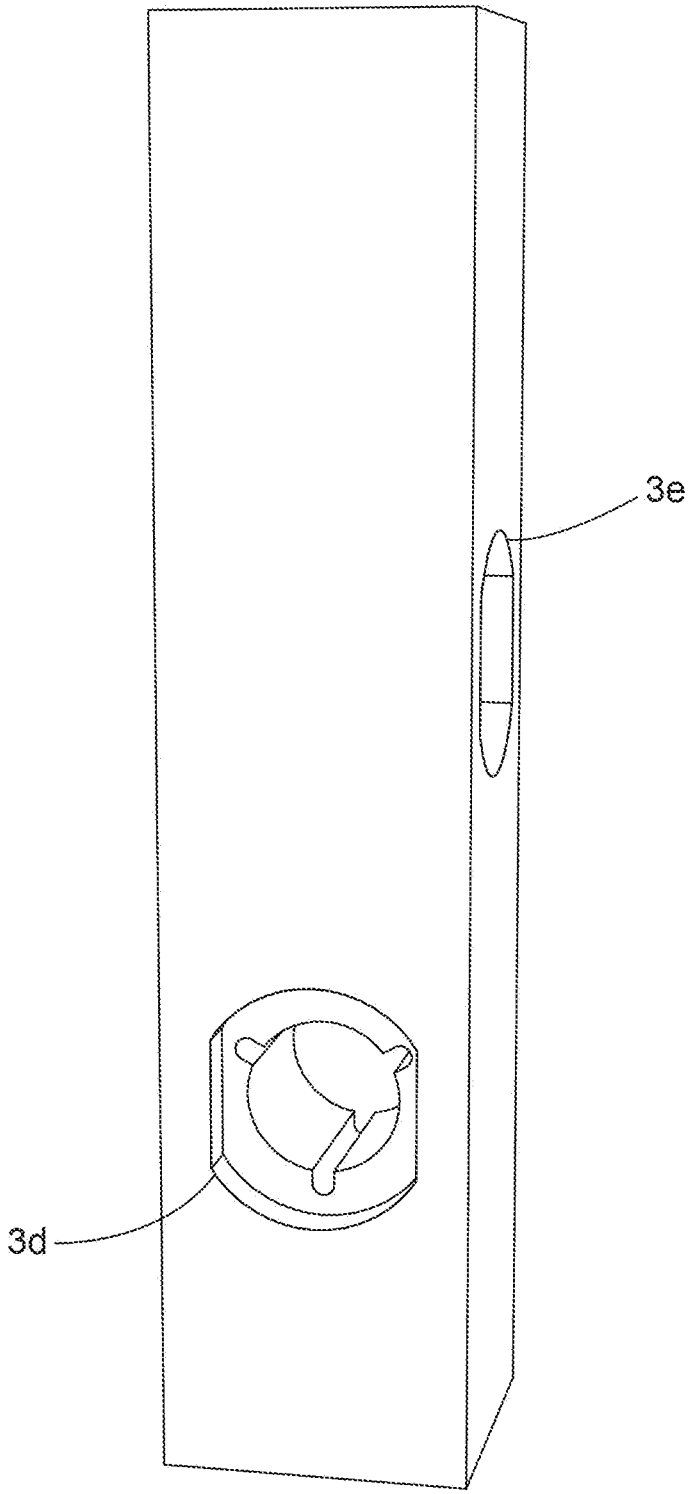
FIG. 11 is a perspective view of a two-camera pylon having angularly-shaped cavity openings.
Figure 12:
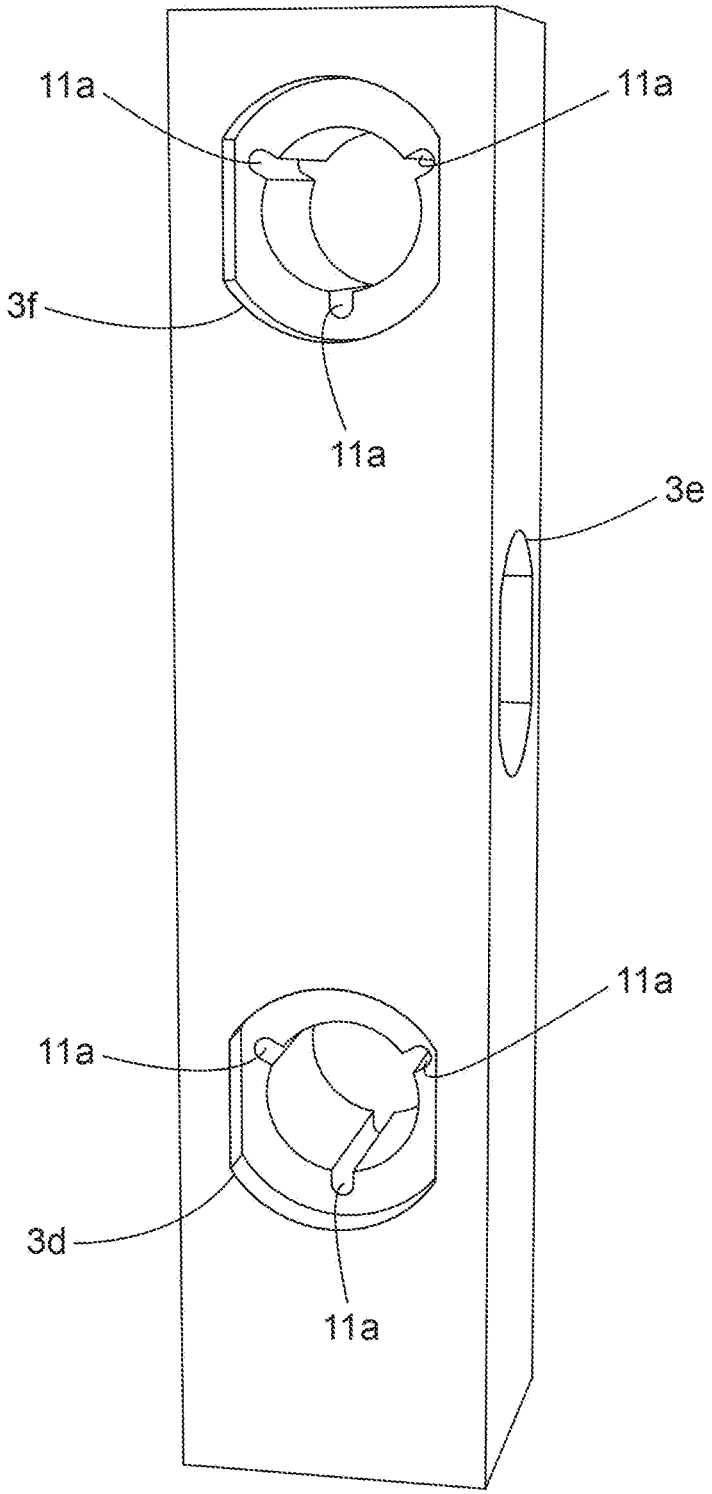
FIG. 12 is a perspective view of a three-camera pylon having angularly-shaped cavity openings.

FIG. 2, an exploded view of a high-definition pylon-mounted camera, Illustrates a variation in design of camera flange [42a] *42*, camera flange cover 14a, cavity 3d, cavity 3e, fan flange 6a, and fan flange cover 8a. FIG. 10, a perspective view, illustrates two-camera pylon 2 having circularly-shaped cavity openings 3a and 3b to be compared to FIG. 11, a perspective view, illustrating a two-camera pylon having angularly-shaped cavity openings 3d and 3e. FIG. 12, a perspective view, illustrates a three-camera pylon having angularly-shaped cavity openings 3d, 3e and 3f, as well as providing a good illustration of notches 11a machined into flange seat 9, as discussed above. These figures are meant as explanatory examples and do not limit the invention in any way. There may be any number of desired cavities in a pylon and notches in a cavity and pylon depending on structural design requirements.

Figure 13:
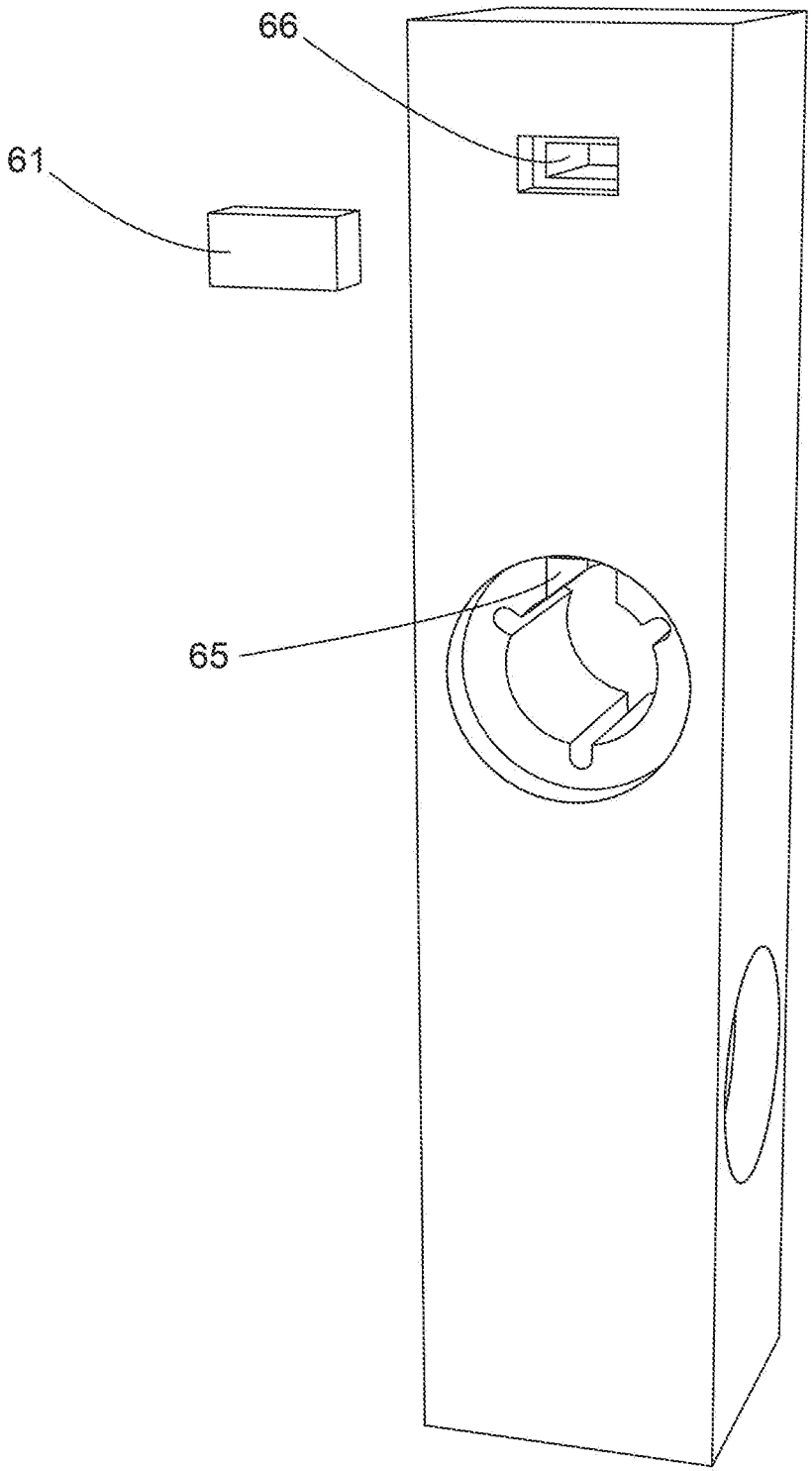
FIG. 13 is a perspective view of a two-camera pylon having spaces configured to hold an RFID chip.

FIG. 13, a perspective view, illustrates a two-camera pylon having two spaces configured to hold an RFID chip. Chip holding space 66 is a discrete cavity within the pylon while chip holding space 65 is integrated into the camera housing cavity. Foam cover 61 covers chip holding space 66 after the chip has been inserted. It is to be understood that the spaces configured to hold any type of chip can be of any desired number and in any style of pylon in keeping with the present inventive concept and principles.

Figure 16:
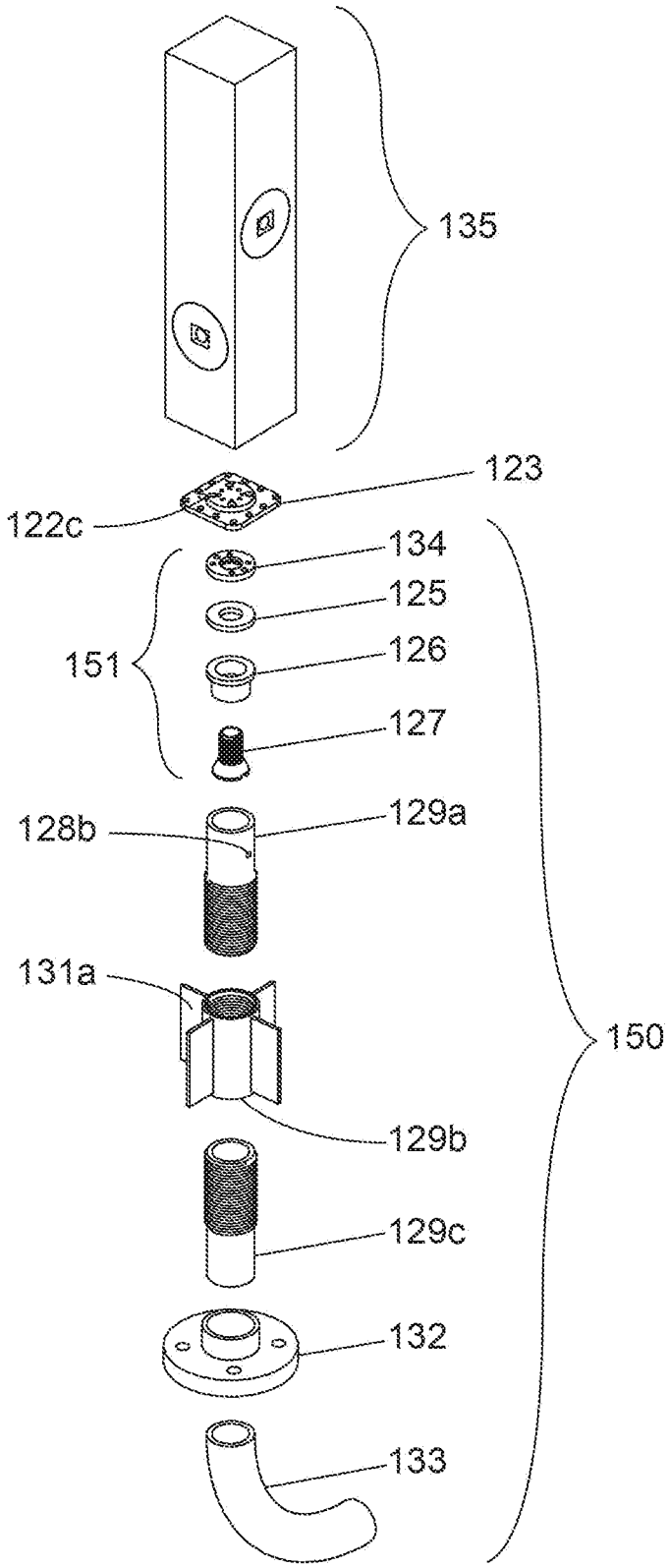
FIG. 16 is a perspective view of an assembled pylon-mounted camera system 135 and an exploded view of the components of base mounting structure 150.

FIG. 16, a perspective top-down view, illustrates assembled pylon-mounted camera system 135 followed by an exploded view illustrating connector base 123 and the separate structural components of base mounting structure 150 that includes sub-assembly 151. Ninety degree sweep conduit section 133 and base mounting flange 132 are seen at the bottom of the structure. Externally threaded lower conduit section 129c is to be threaded into the bottom of the internally threaded coupler 129b. Coupler 129b has four external fins 131a arranged equidistant from each other around the circumference of the coupler to provide resistance to any externally applied radial force. Externally threaded upper conduit section 129a, having anti-rotation pins 128b inserted into the unthreaded portion of the section, is to be threaded into the top of coupler 129b. Wedging plug 127 and rubber plug 126 are to be inserted into the top of the top conduit section, respectively. Foam rubber washer 125 will sit on top of rubber plug 126 and locking nut 134 will be screwed onto wedging plug 127. Connector base 123 is fastened to locking nut 134 with cap head screws through apertures 122c. Pylon-mounted camera system 135 is attached to the top of connector base 123 providing for electrical connection.

Figure 17:
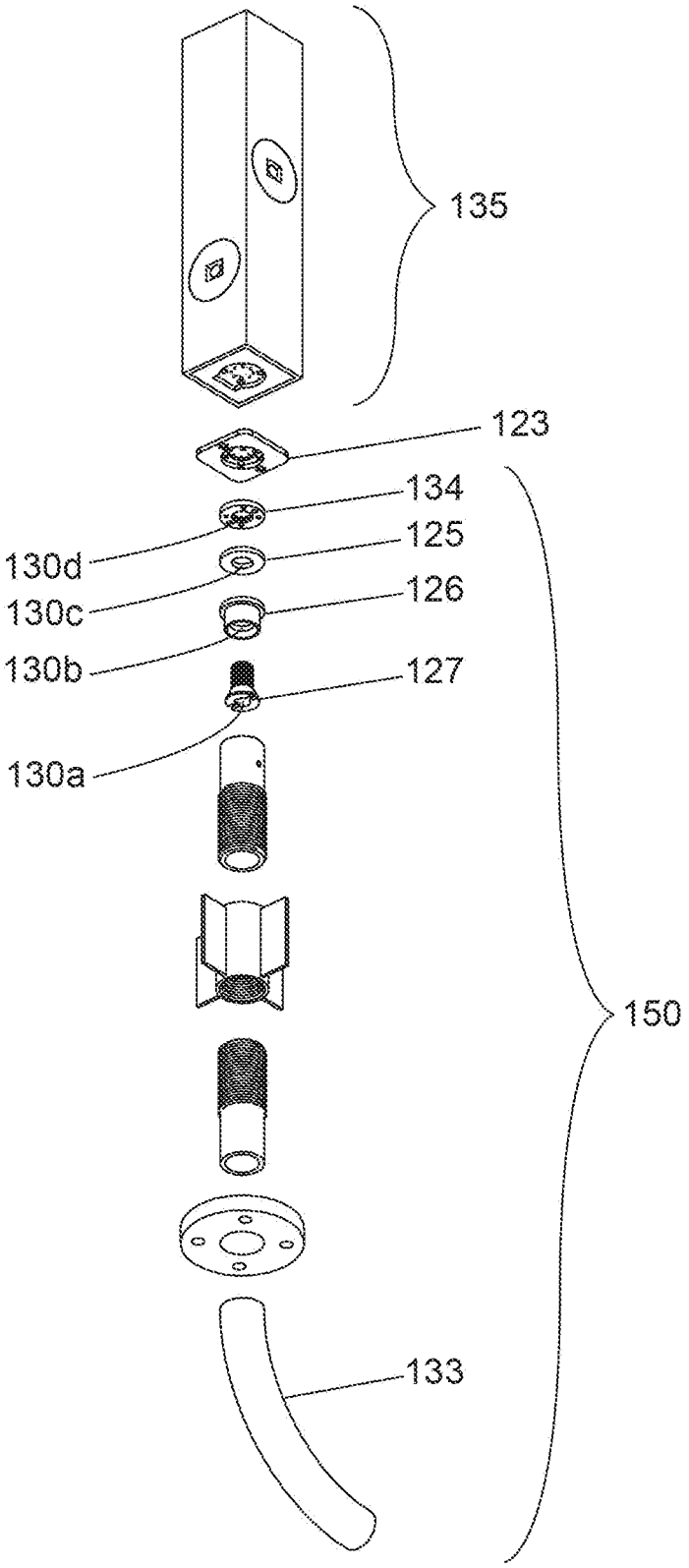
FIG. 17 is a perspective bottom-up view of assembled pylon-mounted camera system 135 and an exploded view of the components of base mounting structure 150.

FIG. 17, a perspective bottom-up view, illustrates assembled pylon-mounted camera system 135 followed by an exploded view of the components of base mounting structure 150, as illustrated in FIG. 16. Cable pass-through aperture 130a in wedging plug 127, cable pass-through aperture 130b in rubber plug 126, cable pass-through aperture 130c in foam rubber washer 125, and cable pass-through aperture 130d in locking nut 134 are also illustrated.

Figure 18:
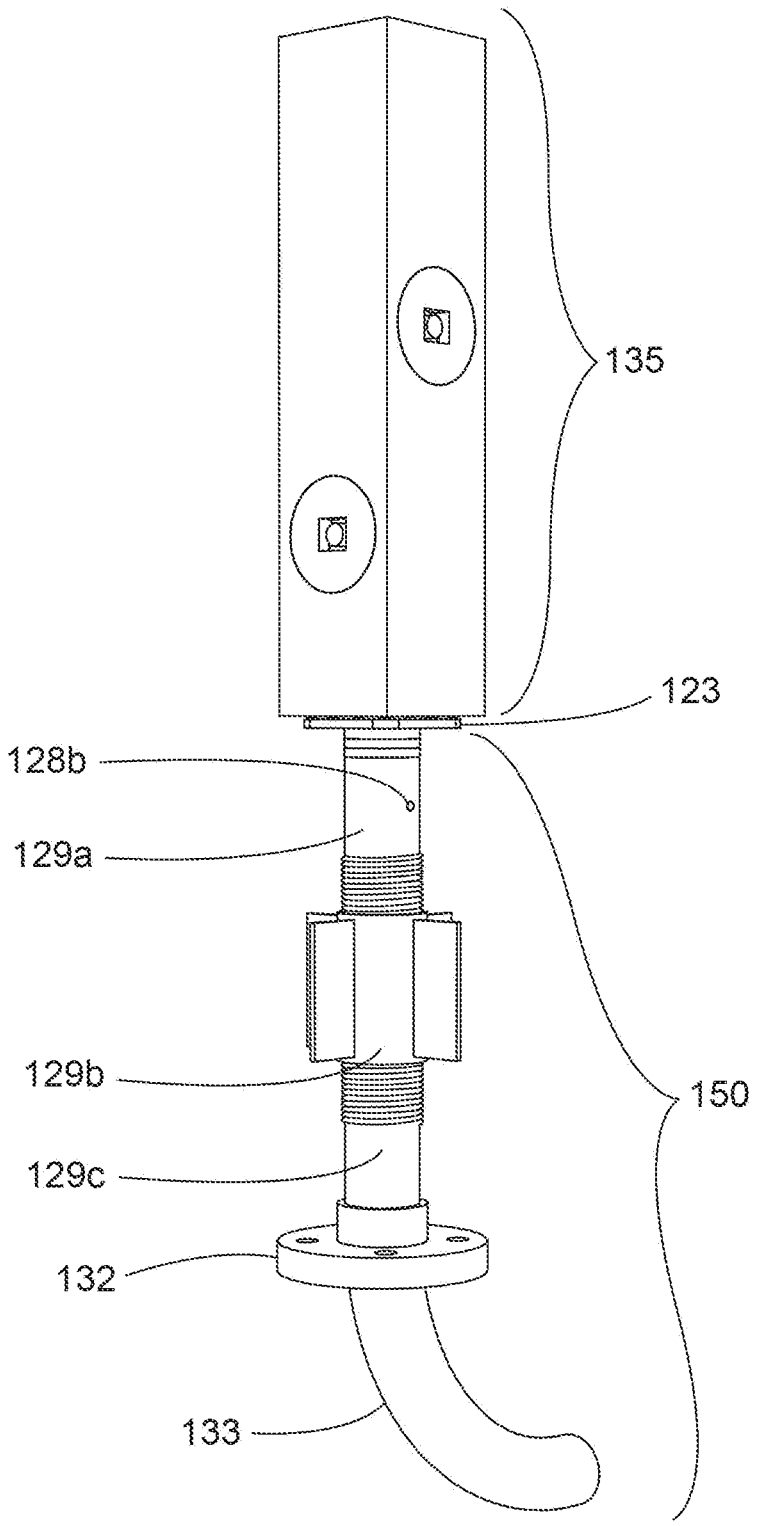
FIG. 18 is a perspective view of assembled base mounting structure attached to assembled pylon-mounted camera system.

FIG. 18, a perspective side view, illustrates assembled base mounting structure 150 attached to connector base 123. Assembled pylon-mounted camera system 135 sits on top of connector base 123.

Figure 19:
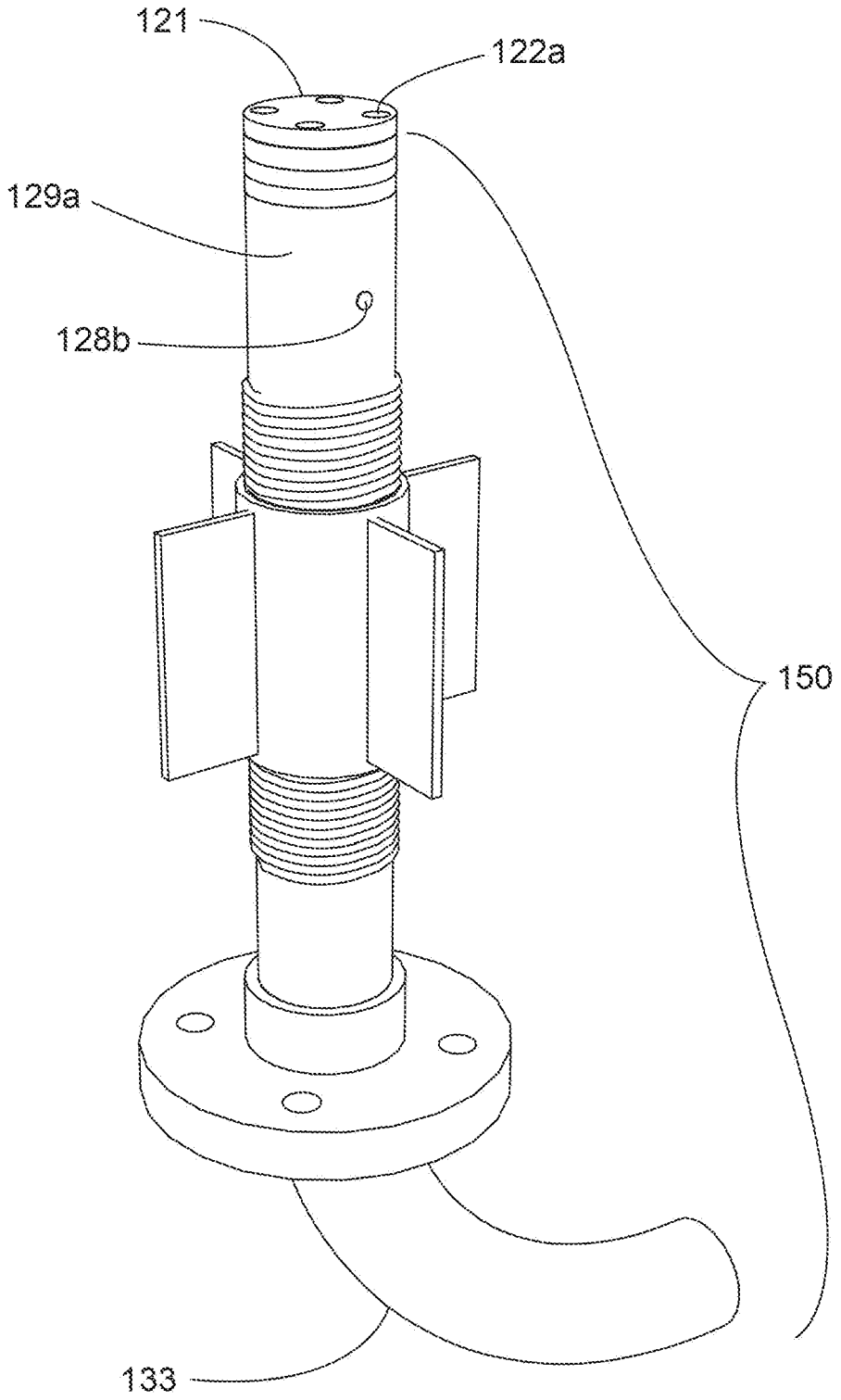
FIG. 19 is a perspective tilted view of assembled base mounting structure with a cap installed.
Figure 20:
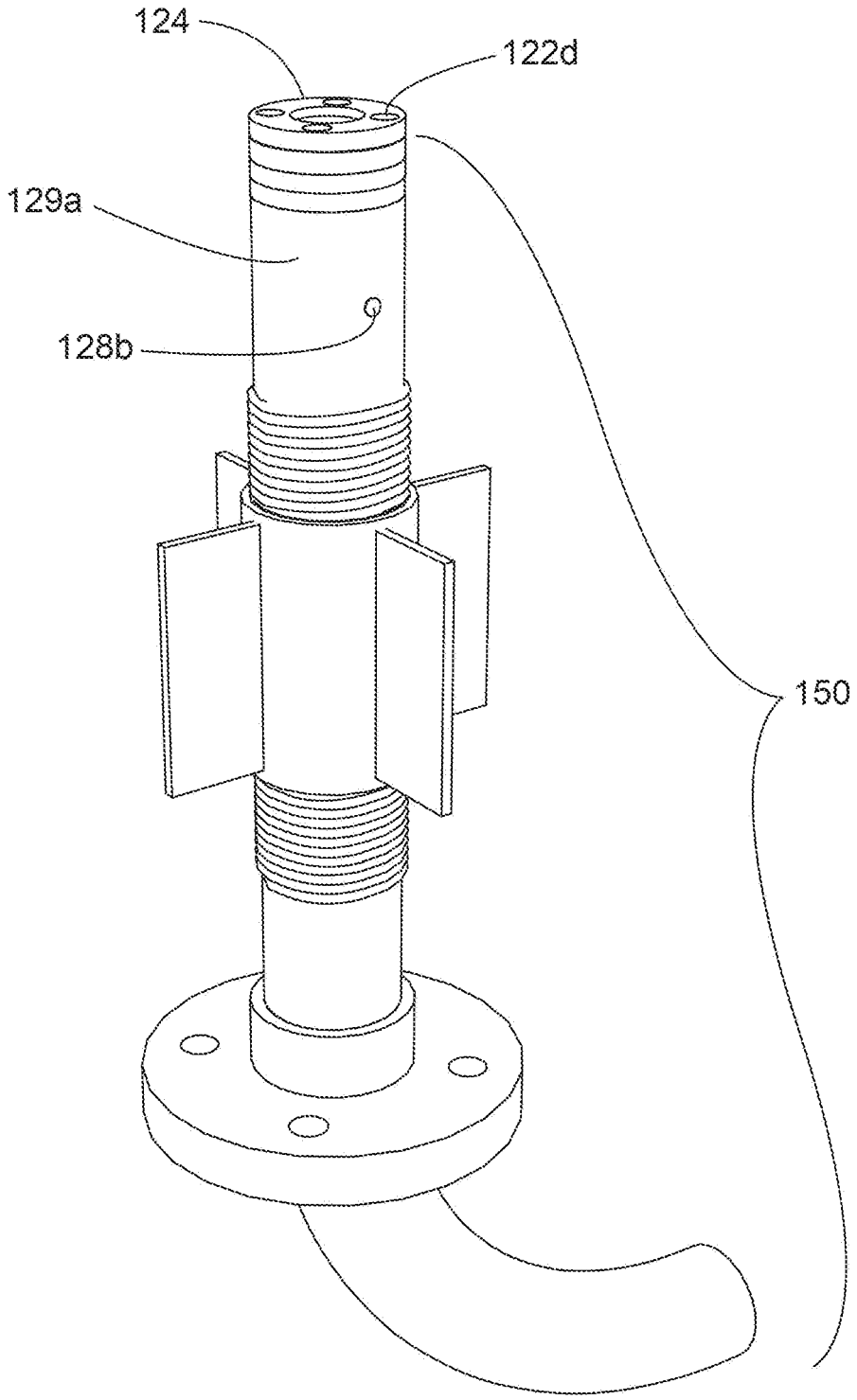
FIG. 20 is a perspective tilted view of assembled base mounting structure with an installed pass-through cap.

FIG. 19 is a perspective tilted view of assembled base mounting structure 150 with cap 121 installed. The cap has flathead screw apertures 122a. FIG. 20 is a perspective tilted view of an assembled base mounting structure 150 showing a pass-through cap 124 installed. The cap has flathead screw apertures 122d.

Figure 21:
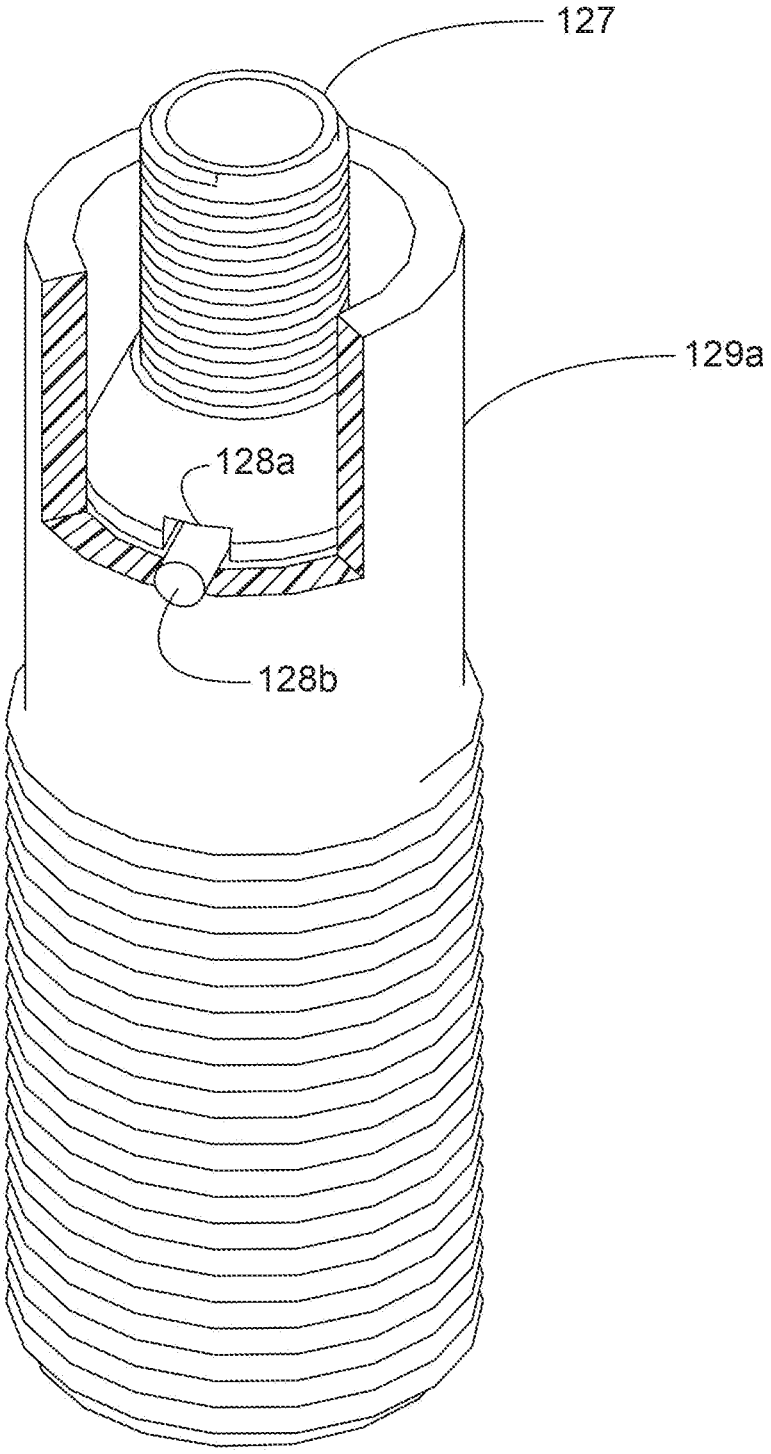
FIG. 21 is a cut-away perspective view illustrating engagement of the anti-rotation pins.

FIG. 21, a cut-away perspective tilted view, illustrates externally threaded top conduit section 129a with a wedging plug 127 inserted. Such a cut-way view allows illustration of the engagement of anti-rotation pins 128b with accepting space 128a. The anti-rotation pins also act as a depth stop when the wedging plug is inserted, preventing the plug from being inserted too far into the top conduit section.

Figure 22:
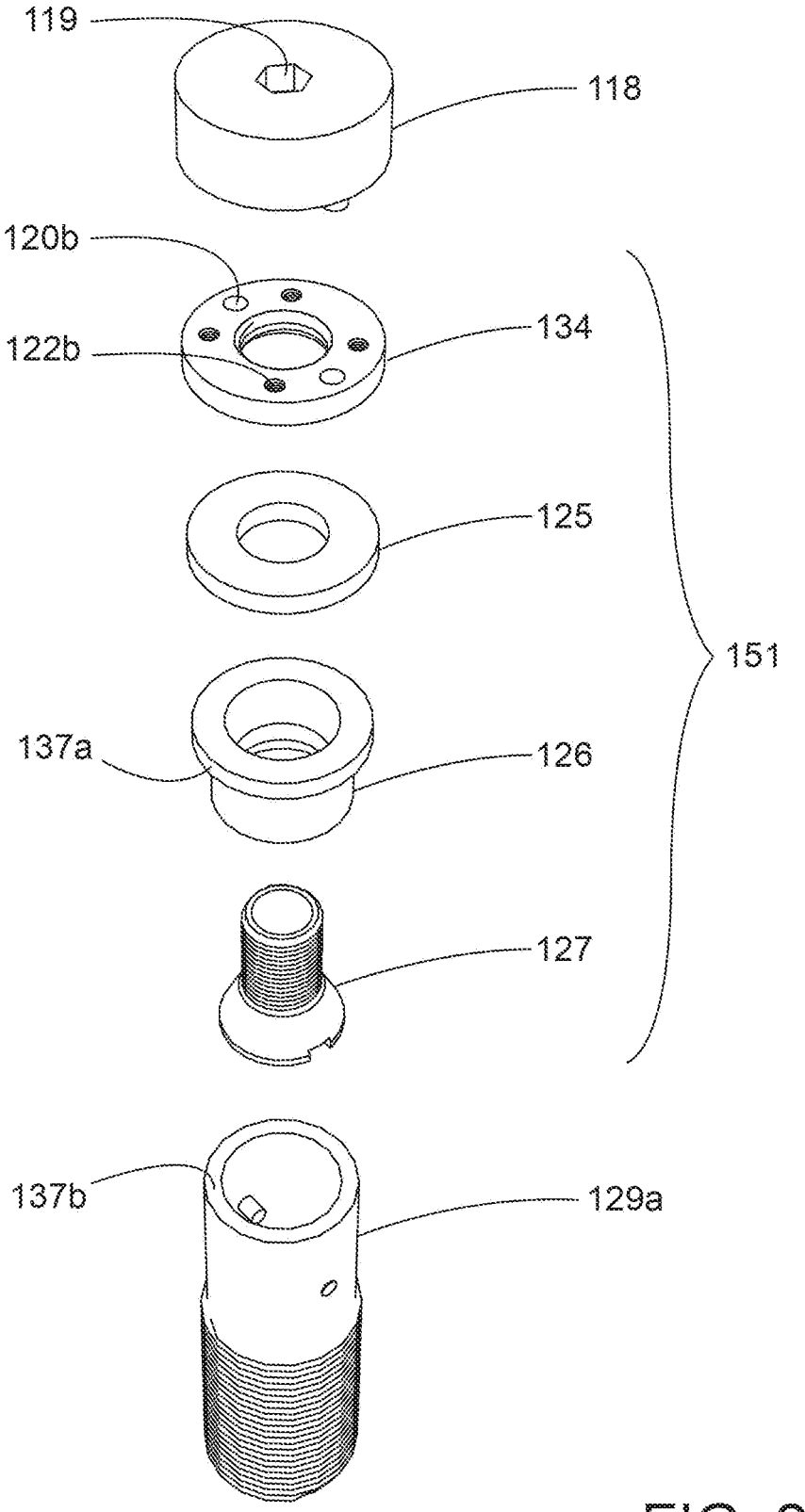
FIG. 22 is a break-away top-down view illustrating torque application tool, plug sub-assembly, and externally threaded top conduit section.

FIG. 22, a break-away view looking down, illustrates tool 118, plug sub-assembly 151, and externally threaded upper conduit section 129a. Tool 118 has hexagonal accepting space 119 into which a hex key can be inserted to provide for the application of torque to the tool. Tool 118 is to sit on locking nut 134 that has screw apertures 122b and pin aperture 120b. Locking nut 134 will sit on foam rubber washer 125 that seats onto the top surface of flange 137a of rubber plug 126 to provide impact force absorption. The bottom surface of flange 137a of rubber plug 126 is to seat onto top surface 137b of the top conduit section.

Figure 23:
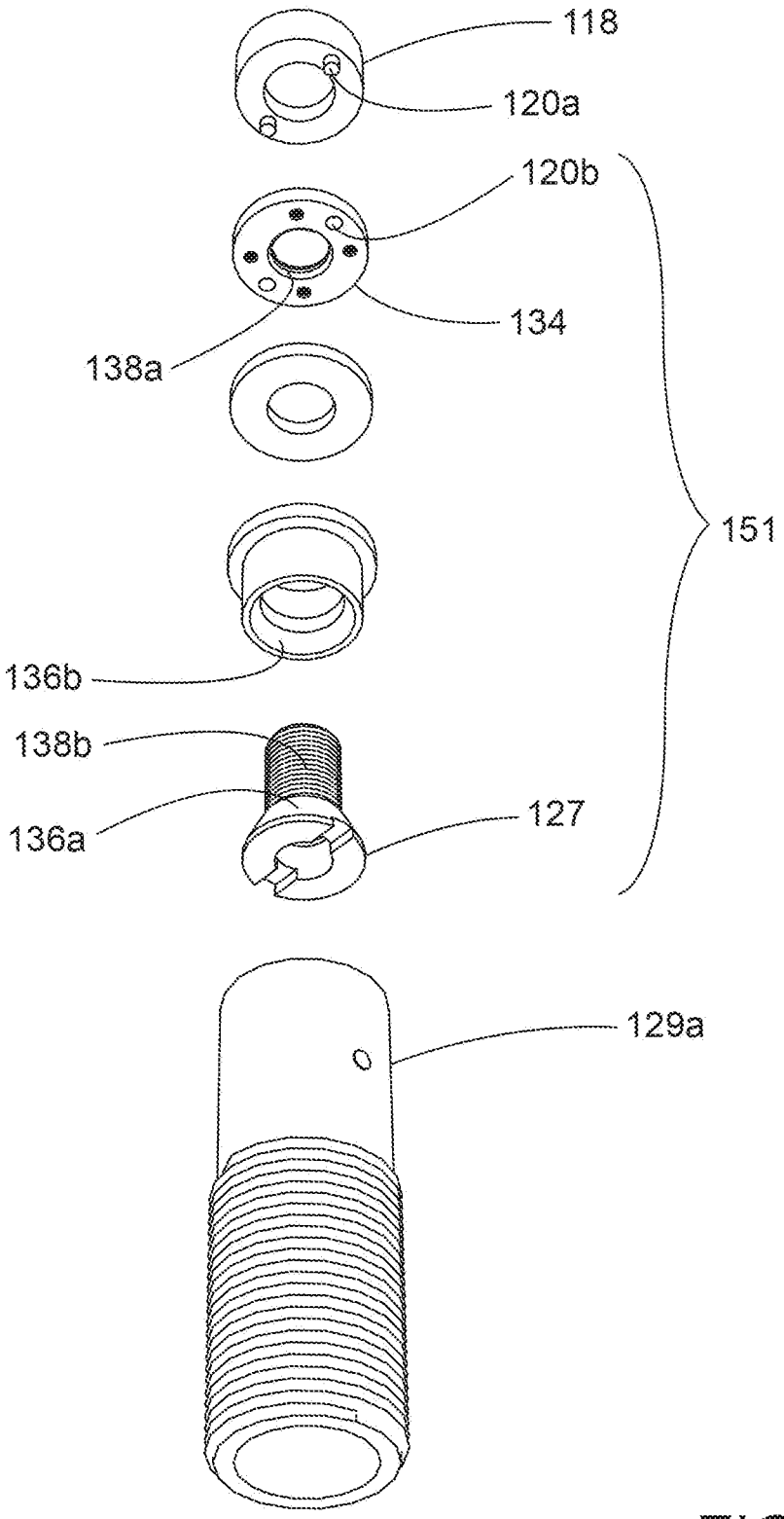
FIG. 23 is a break-away bottom-up view of the structure, as illustrated in FIG. 22.

FIG. 23 is a break-away bottom-up view of the structures illustrated in FIG. 22. From this view it can be better understood that externally threaded surface 138b will engage with the internally threaded section 138a. Pin 120a will engage with pin aperture 120b and when so engaged will transmit the torque applied to tool 118 through the pins to locking nut 134 which when sufficiently torqued will secure together the parts of plug sub-assembly 151. Secured plug sub-assembly 151 will be positioned inside top conduit section 129a and tapered section 136a will wedge against tapered accepting space 136b, deforming the rubber plug such that its circumference increases and force is applied radially to the interior of the top conduit section, securing the plug sub-assembly in place.

"How-to" use of the high-definition camera pylon assembly follows. For purposes of explanation, its use on a football field will be used. It is to be understood, that the high-definition camera pylon assembly can be installed in other types of fields or other locations as desired. The first step in the use of the camera-pylon assembly is to determine the exact desired pylon location. The assembly is to be installed so that it, that is, the pylon, is axially centered at the desired location of the pylon. Once the exact location is determined, the material, such as the soil forming the surface of the location, is excavated to the depth necessary to reach whatever material was used as the base material of the football field. In some cases this material may be a concrete slab, or it may be compacted crushed stone. A trench extending from the pylon location to another location suitable for the installation of a terminating box ("box location"), to be used for housing the transmitter and power supply systems of the pylon camera system, is excavated. Conduit (such as 2" Schedule 80 PVC, for example) is laid horizontally in the trench. The terminating box is then installed at the box location. Near the pylon location, a 90 degree elbow, 90 degree sweep (such as the sweep 133 as illustrated in FIG. 16), or junction box is installed to provide for the conduit run to turn from horizontal to vertical, with the vertical section located at the spot that the pylon was axially centered. The vertical section of sweep 133, or the like, is affixed to base mounting flange 132 which is then secured to the base material by use of a bolt and nut, a spike or similar fastener depending on the properties of the base material. Lower conduit 129c is then mated with base mounting flange 132. Internally threaded coupler 129b is threaded onto the externally threaded conduit section 129c and secured with an adhesive or glue to prevent it from rotating once installed. The externally threaded conduit section 129a with anti-rotation pins 128b is threaded into internally threaded coupler 131. These two parts are not secured with any type of adhesive or glue but are left free to be turned in order to adjust the final height of the assembly to match finished grade. Wedging plug 127 is inserted into the externally threaded upper conduit section 129a with anti-rotation pins, oriented so that the notches in the plug seat onto the anti-rotation pins. Rubber plug 126 is inserted into the externally threaded upper conduit section 129a with anti-rotation pins coaxially with the wedging plug. Foam rubber washer 125 is placed coaxially on top of the rubber plug. Locking nut 134 is threaded onto the wedging plug 127 and tool 118 is used to tighten locking nut 134. After the assembly is installed the tool can be used to remove the locking nut to access the assembly for maintenance. Cap 121 is secured to the locking nut using screws. The excavated area at the pylon location is backfilled and compacted as needed to reach finished grade.

The following will describe the steps for pulling the necessary wires through the conduit from the box location to the pylon location once the assembly is in place and all earthwork has been completed. Cap 121, locking nut 134, foam rubber washer 125, rubber plug 126, and wedging plug 127 are removed so that the conduit can be fully accessed. Wires to carry video signals, power, and data signals are fished through the conduit and terminated with appropriate connectors such as a BNC (a Bayonet Neill—Concelman connector, which is a miniature quick connect/disconnect radio frequency connector used for coaxial cable). If immediate use of a pylon is not desired, Cap 121, locking nut 134, foam rubber washer 125, rubber plug 126, and wedging plug 127 are replaced. Any time a pylon is not being used, the cap is left in place to protect the assembly from penetration by dirt or water.

The following will describe the steps for using a pylon with an installed system. When a high-definition camera pylon, according to the present invention, is to be used, cap 121 is removed and connector base 123 is used in its place. All parts except cap 121 remain in place. The previously fished wires are pulled through the cable pass-through apertures in the wedging plug 127, rubber plug 126, foam rubber washer 125, and locking nut 134 and then connection is made from the wires to the pads in the connector base 123 via a connector such as a BNC. The connected wires are then inserted back down through the cable pass-through apertures and the connector base 123 is secured with cap head screws to locking nut 134. When use of the pylon is complete, the operation is reversed and the cap is reinstalled.

The following will describe the steps for use of pass-through cap 124 instead of the pylon connector 30 in a case where use of a pylon, or other device, that does not have a pylon connector is desired. Cap 121 is removed and the pass-through cap 124 is used in its place. All other parts remain in place. The previously fished wires are pulled through the pass-through cap and can be connected to a device as required. When use of the pass-through cap 124 is complete, the operation is reversed and the cap is reinstalled.

Figure 24:
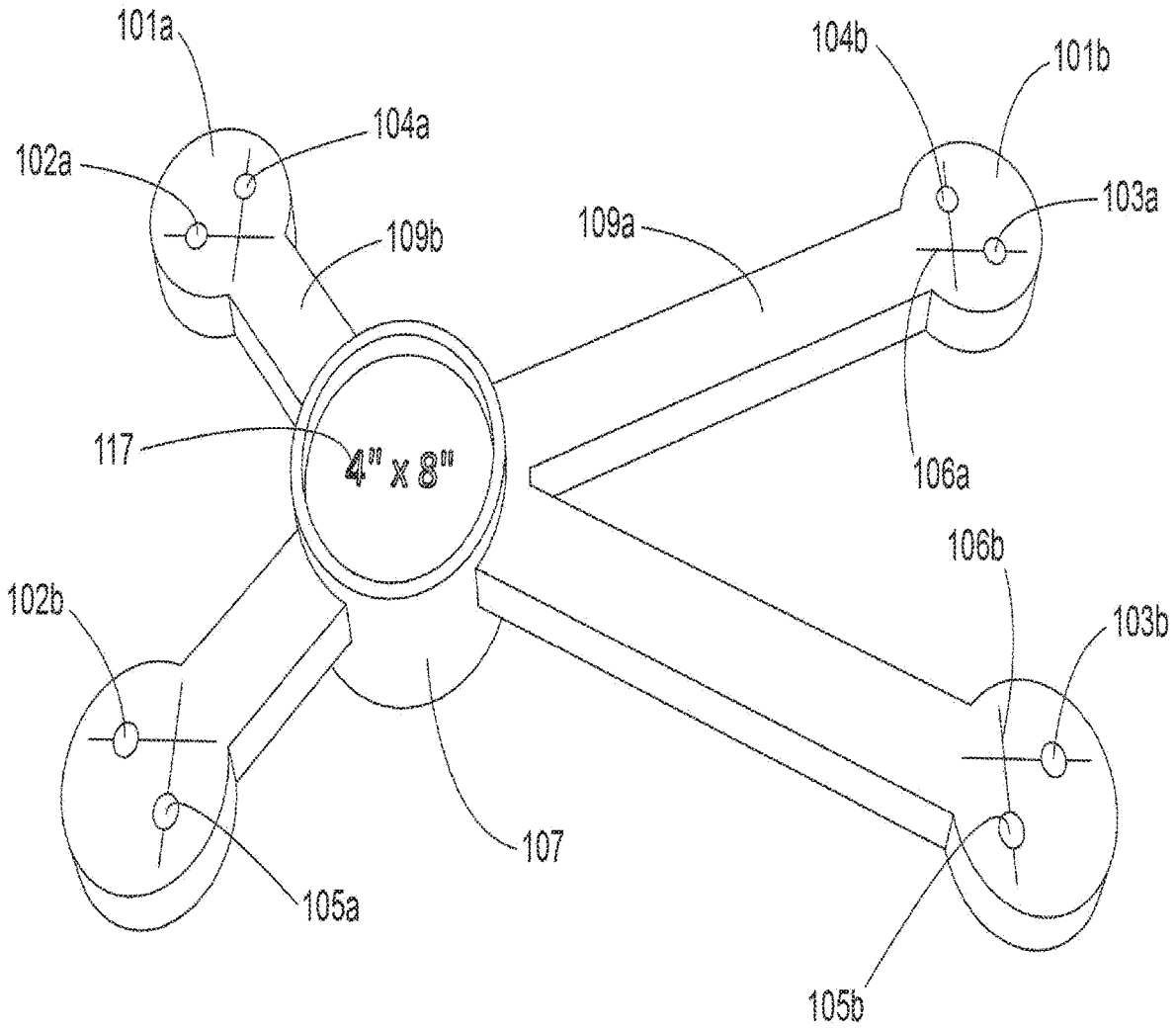
FIG. 24 is a perspective view looking down on the top of a line marking template tool.

In the current example of a football field the location where the assembly is being installed must be precisely located. The precisely located pylon, in turn, can be helpful for the grounds crew who paint the boundaries onto the field as they can use the location of the installed assembly as a reference point applying paint, chalk, or a similar compound to the field to mark the boundaries. Thus, the inventive concept includes providing for a Line Marking Template Tool. FIG. 24 is a perspective tilted view looking down on the top of an exemplar line-marking template tool. The Line-Marking Template Tool is made of a material that provides the durability desired to withstand frequent handling, in this example the material used to make the tool is aluminum, and as the Tool may frequently be coated by paint overspray in the course of its normal use, the aluminum has a smooth surface finish that will allow this paint, should it become built up, to be easily cleaned from the surface by use of abrasives and/or chemical solvents. Four arms, exemplified by arms 109a and 109b, extend radially from the tool's center section 107. At the end of each arm is a pod, such as pods pointed to by 101a and 101b. Each pod has multiple channels 102a therethrough, through which a common duplex nail 110 is to be inserted. Opposite pairs of channels are typically spaced so that their centers are either 4" or 8" apart (4" and 8" are common widths for painted lines on athletic fields), but may be spaced closer or farther for different applications. To illustrate, channels 102a and 102b and 103a and 103b are spaced 4" apart on center. Channels 104a and 104b and 105a and 105b are spaced 8" apart on center. A set of perpendicularly intersecting positioning lines 6a and 6b are engraved, or otherwise permanently marked, on the surface of each pod centered on the channels. The positioning lines serve as a reference to indicate the alignment of the lines to be painted. Label 117 indicates the spacing of the channels, 4" and 8" in this example, and, to wit, the line dimensions for which the tool may be used, and is engraved or otherwise permanently marked on the surface of center section 107.

Figure 25:
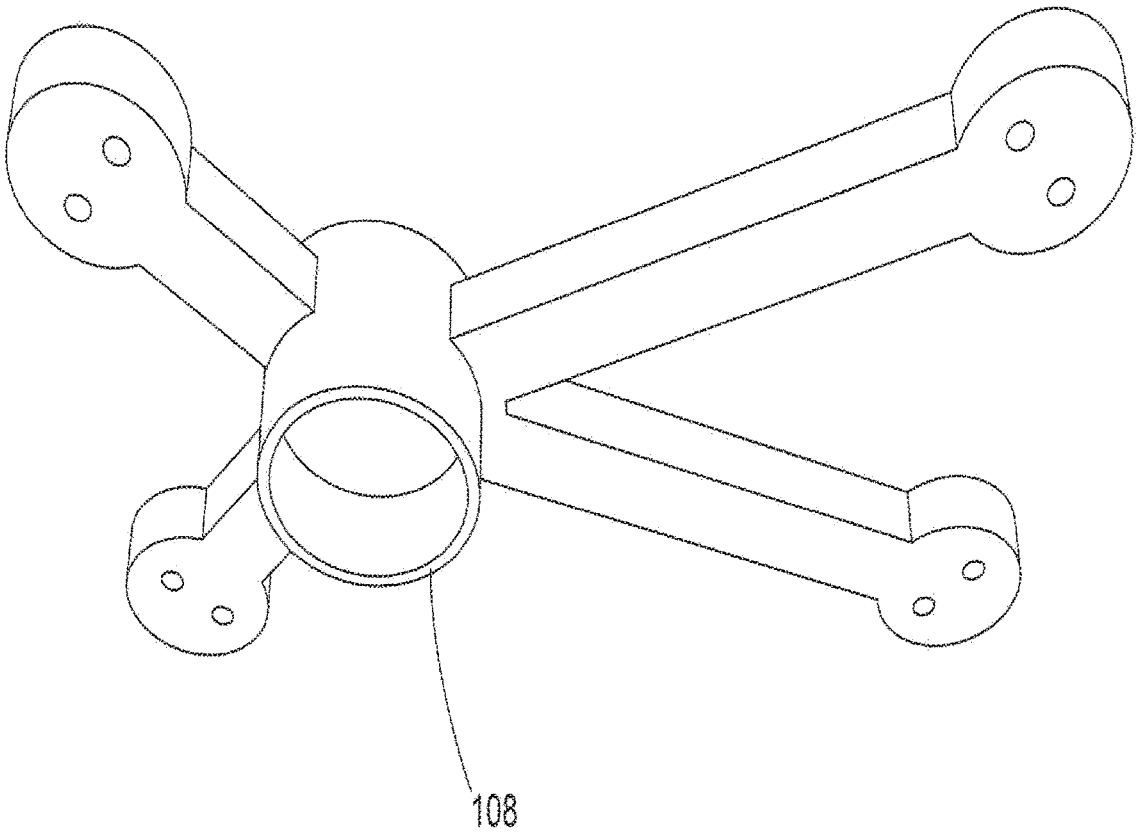
FIG. 25 is a perspective view looking up to the bottom of a line marking template tool.

FIG. 25 is a perspective view looking up to the bottom of an exemplar line marking template tool. Flange 108 forms the bottom surface of the rim edge of the tool's center section and has an inside diameter that matches the outside diameter of cap 121, enabling the flange 108 to be placed over cap 121, thus correctly locating the line marking template tool at the pylon position.

Figure 26:
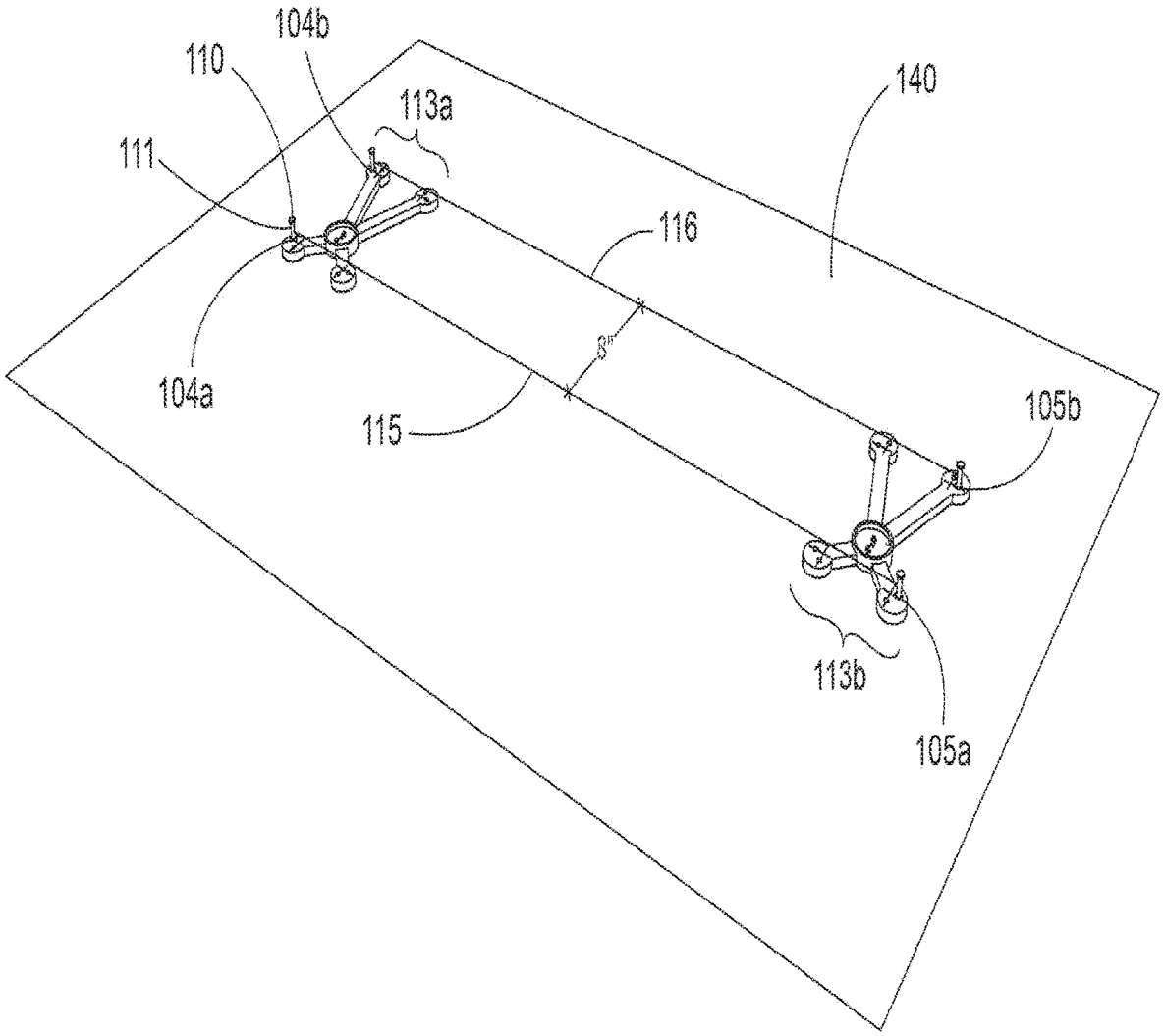
FIG. 26 is a perspective view of line marking template tools in use.

FIG. 26, a perspective tilted view, illustrates an example scenario of marking an 8" wide line as a goal line using paint applied to the field surface. The ground surface finished grade 140 represents the field surface. One Line Marking Template Tool 113a would be placed at the pylon position at one end of the line and a second Tool 113b placed at the position at the other end of the line with each tool's flange over the cap at their respective positions. The tools are oriented so that the eight inch dimensions of each opposite tool are parallel. A common duplex nail 110 is placed in each aperture 104a and aperture 104b of one tool 113a and in each aperture 105a and aperture 105b of the other tool 113b. The nails are pushed into the ground, securing the tool in its orientation. A string 115 is affixed to the top section 111 of the nail in aperture 104a of the first tool and stretched taut across the field to aperture 105a of the second tool, where it is secured. A second string 116 is similarly affixed to the nail in aperture 104b of the first tool and stretched taut across the field to aperture 105b of the second tool. The area between the strings will measure 8", and serve to indicate the area where paint should be applied to the field to create the marking. Upon completion of the marking, the strings and nails are removed and the tools are removed.

Figure 27:
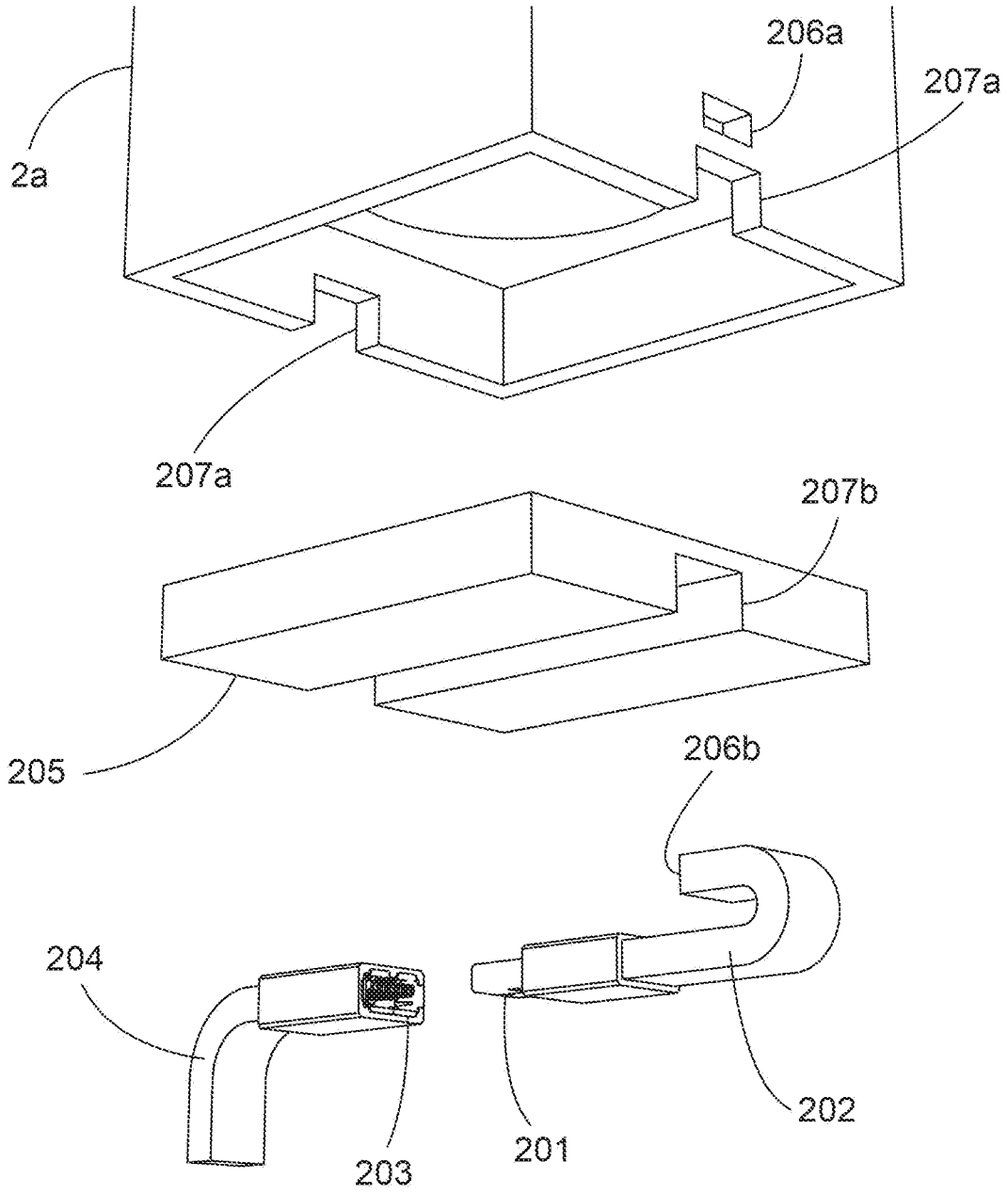
FIG. 27 is a perspective exploded view of a pylon configured with USB3 connectors.
Figure 28:
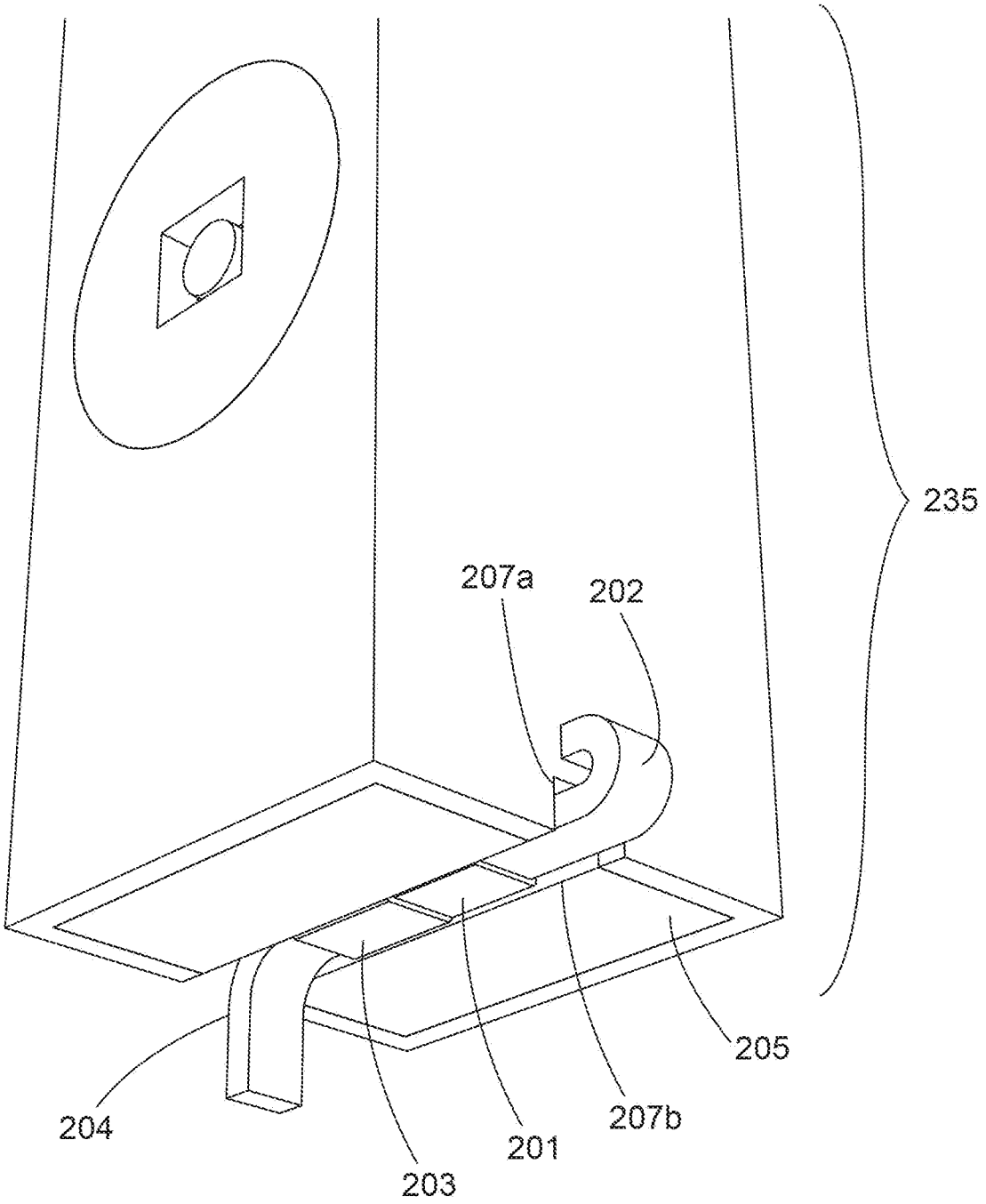
FIG. 28 is a perspective view of an assembled pylon configured with USB3 connectors.

A pylon-mounted camera system may also be used on a short-term, temporary basis in a location where a base connector 20 is not installed. In this case, in place of the pylon connector 30 and base connector 20, the electrical connection between the camera and the transmitter is made through another type of non-locking connector such as a USB3 connector, which still allows for the pylon to non-destructively break away from the wires in the ground. FIG. 27 illustrates such a connection. Flexible cable 204 is connected at one end to the transmitter (not shown) and at the pylon location flexible cable 204 is terminated with USB3 receptacle 203. USB3 receptacle 203 mates with USB3 plug 201, which terminates one end of flexible cable 202. Pylon 2a has cable pass-through aperture 206a through which the second end 206b of cable 202 is inserted and subsequently connected to the camera (not shown). Foam insert 205 fills the space in the bottom of pylon 2a otherwise filled by a pylon connector. It is inserted so that its bottom is flush with the bottom of the pylon and any remaining space above the insert inside the pylon allows room to make electrical connections to the wiring throughout the pylon. The foam insert 205 has a notch 207b which aligns with two notches 207a in pylon 2a. FIG. 28 illustrates assembled pylon-mounted camera system 235 which is configured with USB3 connectors. The notches 207a and 207b create a space into which USB3 connectors 201 and 203 and cables 202 and 204 fit so that they do not protrude below the bottom of the pylon and prevent it from standing straight upright when placed on the ground. Cables 202 and 204 are flexible to facilitate the mating of the connectors—the pylon can be laid down on its side, the connectors mated, and then the pylon stood upright.

Figure 29:
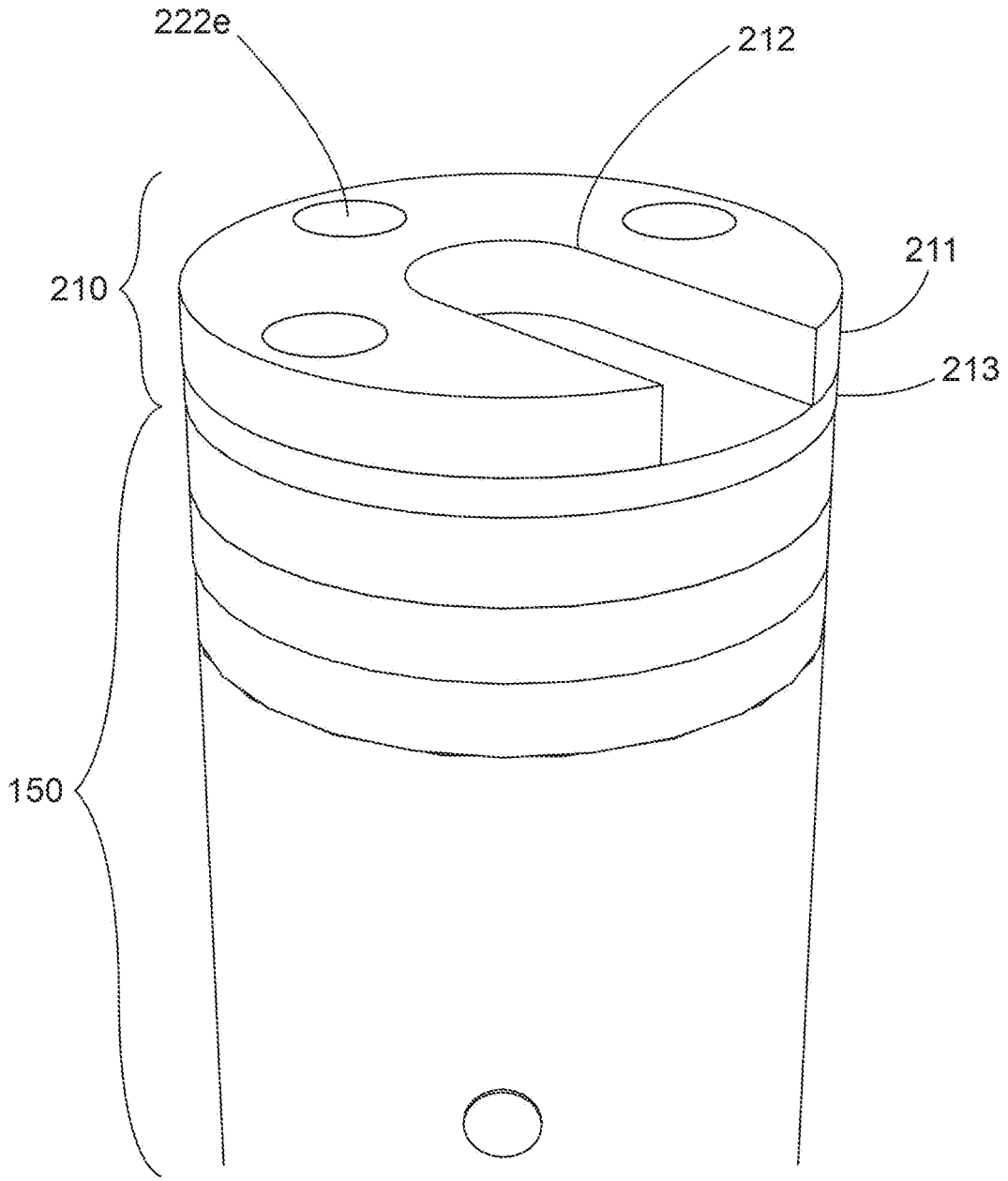
FIG. 29 is a perspective view showing an installed self-sealing cap.
Figure 30:
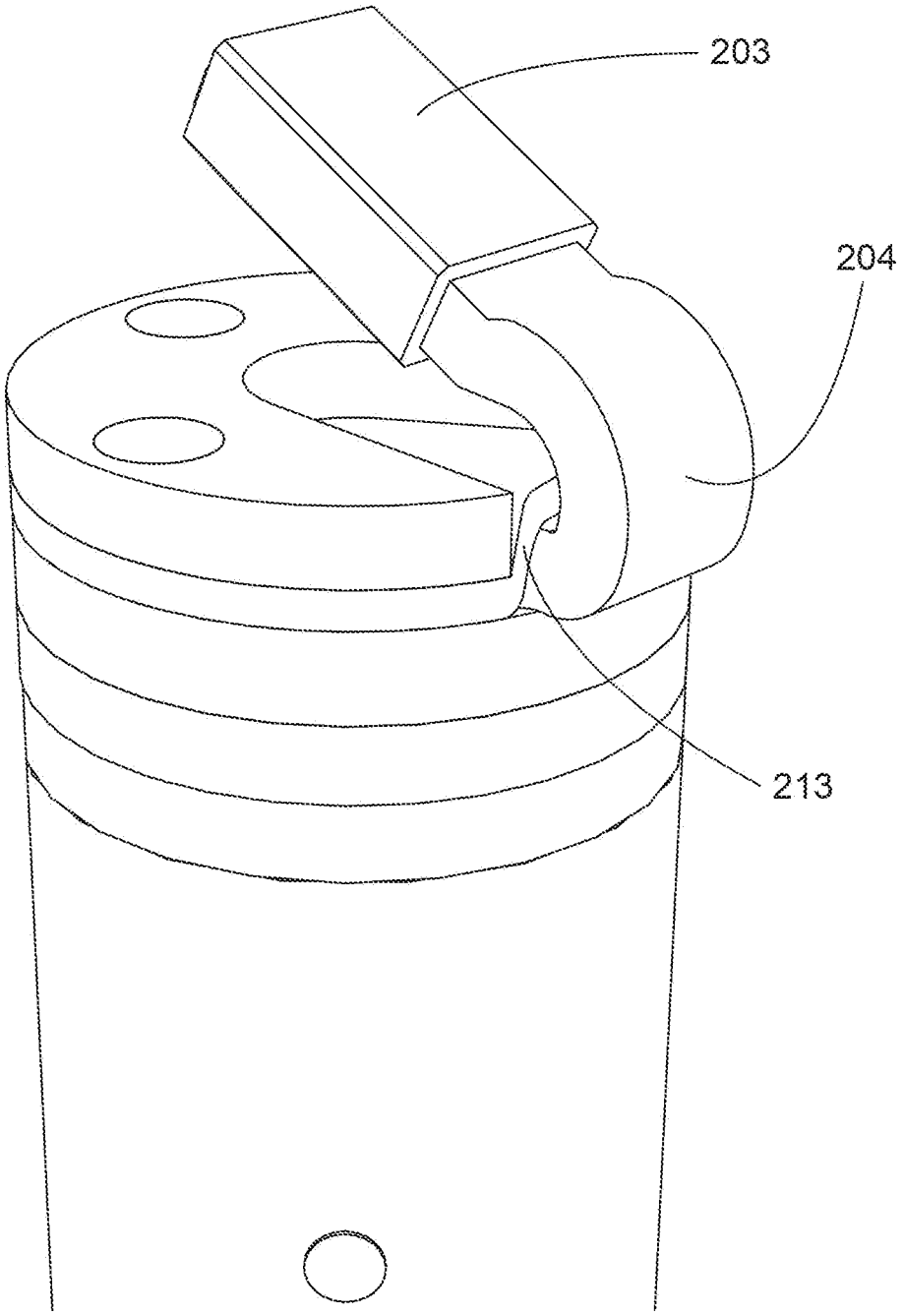
FIG. 30 is a perspective view showing an installed self-sealing cap with USB3 connector and cable in place.

In a case where a base mounting structure is installed outdoors or in another location where it may be exposed to sprays of water (for example, an indoor athletic field with a grass surface irrigated by a sprinkler system) and use of a pylon, or other device, that does not have a pylon connector is desired, self-sealing cap 210 is used instead of pass-through cap 124 (see FIG. 20). FIG. 29 illustrates self-sealing cap 210 installed on base mounting structure 150 (see FIG. 18). Self-sealing cap 210 is comprised of cap 211, in which there is notch 212, and gasket 213. To use the self-sealing cap 210, cap 121 is removed and the previously fished wires are aligned with notch 212. The self-sealing cap is then secured to the structure with flathead screws through apertures 222e. FIG. 30 illustrates an example installation of a flexible cable 204 terminated with a USB3 receptacle 203 (it should be understood that the inventive concept contemplates any other types of cables or connectors that will serve the required function). Gasket 213 is flexible and conforms around the cable, creating a seal that prevents water and other debris from entering the conduit.

*It should be appreciated that the phrase "non-locking connector", is intended to mean a plug and a receptacle (as shown in FIGS. 27 and 28), where the receptacle is arranged to receive and accept the plug therein, specifically in a non-locking manner, in other words, a female connector and a complimentary male connector, or two (2) connectors arranged to engage each other to form a connection, specifically, a non-locking connection.*

*It should be appreciated that the pylon described herein is preferably constructed of a resilient foam, such that the pylon can withstand impact forces that can measure in hundreds, even thousands, of pounds of force, as discussed supra.*

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A wired high-definition pylon-mounted camera assembly, comprising:

a pylon;

one or more high-definition camera sub-assemblies;

one or more cooling fan sub-assemblies;

electrical wiring, and electrical connectors, said pylon molded from high-density, impact resistant foam, said pylon having one or more cavities therethrough, each of said one or more cavities having a first cavity end and a second cavity end, at least one of said one or more cavities having one of said camera sub-assemblies contained in said first end and one of said fan assemblies contained in said second end, said electrical wiring connecting each camera sub-assembly to a pylon-integral electric-conducting break-away pylon connector.

2. The wired high-definition pylon-mounted camera assembly, as recited in claim 1, wherein said pylon connector is fitted with electric conducting pogo pins.

3. The wired high-definition pylon-mounted camera assembly, as recited in claim 2, further comprising a base connector fitted with electrical connection pads for electrical connection with said pogo pins.

4. The wired high-definition pylon-mounted camera assembly, as recited in claim 3, wherein said pylon connector is shaped to key-fit said base connector.

5. The wired high-definition pylon-mounted camera assembly, as recited in claim 4, wherein when said pylon-mounted camera assembly is assembled and installed for use, electrical wires extending from said electrical connection pads are connected to a transmitter, completing the electrical circuit to carry power, data, and video signals between the camera and a transmitter causing said pylon-mounted camera assembly to provide high-definition images, remote video parameter adjustment, real-time imaging, lower camera mounting, and no overheating problems.

6. The wired high-definition pylon-mounted camera assembly, as recited in claim 5, further comprising where said pylon connector and said connector base are fitted with magnets that assist in the orientation of the connector for quick and accurate mating.

7. The wired high-definition pylon-mounted camera assembly, as recited in claim 1, wherein when said pylon contains a multiple number of said cavities, said cavities do not intersect providing for a "crush zone" between cavities.

8. The wired high-definition pylon-mounted camera assembly, as recited in claim 1, wherein each camera sub-assembly includes a camera, interchangeable lens, a camera housing, and a camera-flange.

9. The wired high-definition pylon-mounted camera assembly, as recited in claim 1, wherein each fan sub-assembly includes a fan, and a fan-flange.

10. The wired high-definition pylon-mounted camera assembly, as recited in claim 1, further comprising a stabilizing weight in said pylon.

11. The wired high-definition pylon-mounted camera assembly, as recited in claim 1, further comprising a microphone.

12. The wired high-definition pylon-mounted camera assembly, as recited in claim 5, wherein said pylon-mounted camera assembly is a permanently mountable pylon-mounted camera assembly.

13. The wired high-definition pylon-mounted camera assembly, as recited in claim 12, wherein said permanently mountable pylon-mounted camera assembly is fitted with a base mounting structure.

14. The wired high-definition pylon-mounted camera assembly, as recited in claim 13, wherein said base mounting structure comprises:

a base member providing a ninety-degree horizontal to vertical conduit turn connected to a coupler, said coupler having external fins arranged around a circumference of the coupler to provide resistance to any externally applied radial force, connected to an upper conduit section having anti-rotation pins inserted into a portion of the upper conduit section, a wedging plug and a rubber plug inserted into a top opening of the upper conduit section, a foam rubber washer positioned on top of the rubber plug and a locking nut screwed onto the wedging plug, said locking nut fastened to a bottom surface of said connector base of said pylon-mounted camera system, said base mounting structure therein providing for permanent electrical connection of said camera system to a transmitter.

15. The wired high-definition pylon-mounted camera assembly, as recited in claim 14, wherein said base mounting structure further comprises:

said base member connected to a base section of a base mounting flange that is connected to a lower conduit section that is connected to a bottom of said coupler, said connected to a lower section of said upper conduit section having said wedging plug and said rubber plug inserted into the top opening of the upper conduit section with said foam rubber washer positioned on top of the rubber plug, the locking nut screwed onto the wedging plug, said locking nut fastened to a bottom surface of said connector base, said connector base having said pylon-mounted camera system attached to its top surface of connector base.

16. The wired high-definition pylon-mounted camera assembly, as recited in claim 14, further comprising said electrical wires from said electrical connection pads extending through said base member of said base mounting structure to continue within a conduit in the ground to carry the electrical signals that travel from the camera through the pylon connector, connector base, base mounting structure and the conduit in the ground to a fiber optic transmitter that powers the pylon cameras and converts the electrical signals to optical signals.

17. The wired high-definition pylon-mounted camera assembly, as recited in claim 4, wherein said pylon-mounted camera assembly is a portable assembly having electrical connection between the camera and the transmitter made through a non-locking connector, said non-locking connector providing for said pylon to non-destructively break away from ground wires.

18. The wired high-definition pylon-mounted camera assembly, as recited in claim 16, wherein said non-locking connector is a USB3 connector.

19. A wired high-definition pylon-mounted camera assembly, comprising:

a pylon;

one or more high-definition camera sub-assemblies;

one or more cooling fan sub-assemblies;

electrical wiring, and electrical connectors, said pylon molded from high-density, impact resistant foam, said pylon having one or more cavities therethrough, each of said one or more cavities having a first cavity end and a second cavity end, at least one of said one or more cavities having one of said camera sub-assemblies contained in said first end and one of said fan assemblies contained in said second end, said electrical wiring connecting each camera sub-assembly to a pylon-integral electric-conducting break-away pylon connector, said pylon connector is fitted with electric conducting pogo pins, a base connector fitted with electrical connection pads for electrical connection with said pogo pins, said pylon connector shaped to key-fit said base connector, wherein when said pylon-mounted camera assembly is assembled and installed for use, electrical wires extending from said electrical connection pads are connected to a transmitter, completing the electrical circuit to carry power, data, and video signals between the camera and a transmitter causing said pylon-mounted camera assembly to provide high-definition images, remote video parameter adjustment, real-time imaging, lower camera mounting, and no overheating problems.

20. A wired high-definition pylon-mounted camera assembly, comprising:

a pylon;

one or more high-definition camera sub-assemblies;

one or more cooling fan sub-assemblies;

electrical wiring, and electrical connectors, said pylon molded from high-density, impact resistant foam, said pylon having one or more cavities therethrough, each of said one or more cavities having a first cavity end and a second cavity end, at least one of said one or more cavities having one of said camera sub-assemblies contained in said first end and one of said fan assemblies contained in said second end, said electrical wiring connecting each camera sub-assembly to a pylon-integral electric-conducting break-away pylon connector, said pylon connector is fitted with electric conducting pogo pins, a base connector fitted with electrical connection pads for electrical connection with said pogo pins, said pylon connector shaped to key-fit said base connector, said pylon connector and said connector base are each fitted with magnets that assist in the orientation of the connectors for quick and accurate mating, said cavities of a pylon containing a multiple number of said cavities do not intersect providing for a "crush zone" between cavities, said pylon containing a stabilizing weight, said pylon-mounted camera assembly further comprising a microphone, said pylon-mounted camera assembly being either a permanently mountable pylon-mounted camera assembly or a portable pylon-mounted camera assembly, wherein when said pylon-mounted camera assembly is assembled and installed for use, electrical wires extending from said electrical connection pads are connected to a transmitter, completing the electrical circuit to carry power, data, and video signals between the camera and a transmitter causing said pylon-mounted camera assembly to provide high-definition images, remote video parameter adjustment, real-time imaging, lower camera mounting, and no overheating problems.

*21. A wired high-definition pylon-mounted camera assembly, comprising:*

*a pylon;*

*two or more high-definition camera sub-assemblies;*

*one or more cooling fan sub-assemblies;*

*electrical wiring, and*

*electrical connectors,*

*said pylon having one or more cavities therethrough, each of said one or more cavities having a first cavity end and a second cavity end,*

*at least one of said one or more cavities having one of said camera sub-assemblies contained in said first end and one of said fan assemblies contained in said second end,*

*said electrical wiring connecting each camera sub-assembly to an electrical-conducting break-away pylon connector.*

*22. A pylon-mounted camera assembly, comprising:*

*a pylon having a body comprised of resilient foam;*

*at least a first camera sub-assembly arranged to be mounted at least partially within said body, said first camera sub-assembly including an open and rigid frame, the open and rigid frame including:*

*a first flange;*

*a second flange spaced apart from said first flange; and,*

*a plurality of rigid connectors, each of said plurality of rigid connectors comprising an elongated spacer having a first end and a second end, said first end of each of said elongated spacers connected to said first flange proximate an outer edge of said first flange, said second end of each of said elongated spacers connected to said second flange proximate an outer edge of said second flange, each of said elongated spacers having a length extending substantially between said first and said second flanges;*

*a first camera having a lens, said first camera affixed to and at least partially surrounded by said open and rigid frame of said first camera sub-assembly; and,*

*an internal electrical wiring assembly comprising at least one cable at least partially contained within said pylon and in electrical communication with said first camera, said at least one cable terminated by one of: a plug and a receptacle,*

*wherein one of: said plug and said receptacle of said at least one cable is arranged to engage at least one external cable, said at least one external cable terminated by one of: an other plug and an other receptacle, thereby forming a non-locking connector between said at least one cable and said at least one external cable.*

*23. The pylon-mounted camera assembly recited in claim 22 further comprising a camera housing, said camera housing arranged to surround said first camera, said camera housing affixed to and at least partially surrounded by said open and rigid frame of said first camera sub-assembly.*

*24. The pylon-mounted camera assembly recited in claim 23 further comprising a fan, said fan affixed to said open and rigid frame.*

*25. The pylon-mounted camera assembly recited in claim 22, wherein each of said plurality of rigid connectors comprises:*

*a bolt; and,*

*a nut; wherein said bolt is arranged to engage said nut thereby connecting said first flange and said second flange of said open and frame.*

*26. The pylon-mounted camera assembly recited in claim 25, wherein each of said plurality of rigid connectors further comprises a sleeve, said sleeve arranged between said first flange and said second flange, wherein said bolt is arranged within said sleeve.*

*27. The pylon-mounted camera assembly recited in claim 22, wherein said first camera has a field of view in a direction outward from said pylon.*

*28. The pylon-mounted camera assembly recited in claim 22, wherein said first camera is affixed to one of: said first flange and said second flange of said open and rigid frame.*

*29. The pylon-mounted camera assembly recited in claim 22, wherein each of said plurality of rigid connectors comprise a bolt that secure said first flange to said second flange, each bolt of said plurality of rigid connectors are arranged to be received in a respective substantially cylindrical sleeve.*

*30. The pylon-mounted camera assembly recited in claim 22, wherein said elongated spacer is substantially cylindrical.*

*31. The pylon-mounted camera assembly recited in claim 22, wherein said elongated spacer comprises a bolt.*

*32. The pylon-mounted camera assembly recited in claim 22, wherein said elongated spacer comprises at least one of:*

*a bolt;*

*a sleeve; and,*

*said bolt and said sleeve, wherein said bolt is arranged to be disposed within said sleeve.*

* * * * *